US010437256B2

United States Patent
Andert et al.

(10) Patent No.: US 10,437,256 B2
(45) Date of Patent: Oct. 8, 2019

(54) SYSTEMS, METHODS, AND APPARATUSES FOR IMPLEMENTING TIME SENSITIVE AUTONOMOUS INTERSECTION MANAGEMENT

(71) Applicants: Edward Andert, Tempe, AZ (US); Mohammad Khayatian, Tempe, AZ (US); Aviral Shrivastava, Phoenix, AZ (US)

(72) Inventors: Edward Andert, Tempe, AZ (US); Mohammad Khayatian, Tempe, AZ (US); Aviral Shrivastava, Phoenix, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 15/934,772

(22) Filed: Mar. 23, 2018

(65) Prior Publication Data
US 2018/0275678 A1    Sep. 27, 2018

Related U.S. Application Data

(60) Provisional application No. 62/475,415, filed on Mar. 23, 2017.

(51) Int. Cl.
*G05D 1/02* (2006.01)
*G08G 1/16* (2006.01)
*H04W 4/44* (2018.01)

(52) U.S. Cl.
CPC .......... *G05D 1/0276* (2013.01); *G08G 1/164* (2013.01); *G08G 1/166* (2013.01); *H04W 4/44* (2018.02)

(58) Field of Classification Search
CPC ....... G05D 1/0276; H04W 4/44; G08G 1/164; G08G 1/166
(Continued)

(56) References Cited

U.S. PATENT DOCUMENTS

| 9,020,660 B2 * | 4/2015 | Mudalige | G08G 1/164 |
| | | | 701/2 |
| 2013/0253754 A1 * | 9/2013 | Ferguson | G05D 1/0231 |
| | | | 701/28 |

(Continued)

OTHER PUBLICATIONS

Andert, E. et al., "Crossroads—A Time-Sensitive Autonomous Intersection Management Technique", Presentation, Jun. 2017 [retrieved May 23, 2019], 29 slides, retrieved from the internet <URL:http://aviral.lab.asu.edu/bibadmin/uploads/slides/Crossroads_DAC.pptx>.

(Continued)

*Primary Examiner* — Daryl C Pope

(57) ABSTRACT

In embodiments, an apparatus for intersection management of autonomous or semi-autonomous vehicles may include an input interface to receive an intersection crossing request from one or more autonomous or semi-autonomous vehicles, the request including vehicle data; an output interface coupled to a transmitter, and an analyzer coupled to the input interface and to the output interface to process the request, based, at least in part, on the vehicle data, to generate a command including a crossing velocity and a time to assume the crossing velocity, and cause the transmitter, via the output interface, to transmit the command to the requesting vehicle. Other and related embodiments are also described.

17 Claims, 14 Drawing Sheets

(58) Field of Classification Search
USPC .......................................... 340/539.1, 539.11
See application file for complete search history.

(56) References Cited

U.S. PATENT DOCUMENTS

2017/0221366 A1* 8/2017 An .................... G08G 1/166
2017/0262709 A1* 9/2017 Wellington ........ G06K 9/00791
2018/0329418 A1* 11/2018 Baalke ................ G05D 1/024

OTHER PUBLICATIONS

Andert, E. et al., "Crossroads—A Time-Sensitive Autonomous Intersection Management Technique", Proceedings of the 54th Annual Design Automation Conference (Austin, Texas, Jun. 18-22, 2017), Pre-Print Publication available Feb. 2017 [retrieved May 28, 2019], 6 pages, retrieved from the Internet: <URL:http://aviral.lab_asu_edu/bibadmin/uploads/pdf/CrossroadsDAC17.pdf>.

Andert, E. et al., "Crossroads: Time-Sensitive Autonomous Intersection Management Technique", Proceedings of the 54th Annual Design Automation Conference (Austin, Texas, Jun. 18-22, 2017), 2017, article 50, 6 pages <DOI:10.1145/3061639.3062221>.

Andert, E., "Crossroads—A Time-Sensitive Autonomous Intersection Management Technique", Arizona State University, Presentation for Master's Thesis Defense, Jan. 2017, 33 slides.

Andert, E., "Crossroads —A Time-Sensitive Autonomous Intersection Management Technique", Arizona State University, Master's Thesis, May 2017 [retrieved May 23, 2019], 34 pages, retrieved from the internet <https://search-proquest-com.ezproxy1.lib.asu.edu/docview/1896955376?pq-origsite=primo>.

Dresner, K. et al., "A Multiagent Approach to Autonomous Intersection Management", Journal of Artificial Intelligence Research, Jan. 2008, vol. 31, pp. 591-656 <DOI:10.1613/jair.2502>.

Dresner, K. et al., "Multiagent traffic management: a reservation-based intersection control mechanism", Proceedings of the Third International Joint Conference on Autonomous Agents and Multiagent Systems (New York, New York, Jul. 23-24, 2004), 2004 [Date Added to IEEE Xplore: May 2005], pp. 530-537.

Dresner, K. et al., "Multiagent Traffic Management: An Improved Intersection Control Mechanism", Proceedings of the fourth international joint conference on Autonomous agents and multiagent systems (Utrecht, Netherlands, Jul. 25-29, 2005), 2005, pp. 471-477.

Fok, C. et al., "A Platform for Evaluating Autonomous Intersection Management Policies", 2012 IEEE/ACM Third International Conference on Cyber-Physical Systems (Beijing, China, Apr. 17-19, 2012), 2012 [Date Added to IEEE Xplore: May 2012], pp. 87-96 <DOI:10.1109/ICCPS.2012.17>.

Lee, J. et al., "Development and Evaluation of a Cooperative Vehicle Intersection Control Algorithm Under the Connected Vehicles Environment",IEEE Transactions on Intelligent Transportation Systems, Mar. 2012 [IEEE Date 3f Publication: Jan. 2012], vol. 13, No. 1, pp. 81-90 <D01:10.1109/TITS.2011.2178836>.

Milanes, V. et al., "Controller for Urban Intersections Based on Wireless Communications and Fuzzy Logic", IEEE Transactions on Intelligent Transportation Systems, Mar. 2010 [IEEE Date of Publication: Dec. 2009], vol. 11, No. 1, pp. 243-248 <DOI:10.1109/TITS.2009.2036595>.

Mills, D., "Internet time synchronization: the network time protocol", IEEE Transactions on Communications, Oct. 1991, vol. 39, No. 10, pp. 1482-1493 <DOI:10.1109/26.103043>.

Perronet, F. et al., "Cooperative Intersection Management: Using Mini-Robots to Compare Sequenced-based Protocols", Les Joumees Nationales des Communications dans les Transports (Nevers, France, Jun. 28-29, 2013), 2013, 7 pages.

Tachet, R. et al., "Revisiting Street Intersections Using SlotBased Systems", PLoS ONE, Mar. 2016, vol. 11, No. 3, article e0149607 <DOI:10.1371/journal.pone.0149607>.

Van Middlesworth, M. et al., "Replacing the Stop Sign: Unmanaged Intersection Control for Autonomous Vehicles", Proceedings of 7th International Conferemce on Autonomous Agents and Multiagent Systems (Estoril, Portugal, May 12-16, 2008), 2008, pp. 1413-1416.

Zohdy, I. et al., "Intersection management for autonomous vehicles using iCACC", 15th International IEEE conference on Intelligent Transportation Systems (Anchorage, Alaska, Sep. 16-19, 2012), 2012 [Date Added to IEEE Xplore: Oct. 2012], pp. 1109-1114 <DOI:10.1109/ITSC.2012.6338827>.

Crossroad Autonomous Intersection 8 Vehicle Demo, https://www.youtube.com/watch?v=pX5TjijLP9o, Feb. 1, 2017, 3 pages.

* cited by examiner

Vehicle modeled with lateral, longitudinal error including a round trip-delay buffer ($E_{Delay}$)

SYSTEMS, METHODS, AND APPARATUSES FOR IMPLEMENTING TIME SENSITIVE AUTONOMOUS INTERSECTION MANAGEMENT

CLAIM OF PRIORITY

This application claims the benefit of U.S. Provisional Patent Application No. 62/475,415, filed on Mar. 23, 2017, the disclosure of which is hereby fully incorporated herein by this reference.

GOVERNMENT RIGHTS AND GOVERNMENT AGENCY SUPPORT NOTICE

Not applicable.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing time sensitive autonomous intersection management.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

As automobiles become autonomous, intersections will no longer be constrained by the humans that are driving present-day vehicles. Instead, automated "Intersection Managers" (IMs) may assume the responsibility for intersection crossings, thus making intersections safer and more efficient. Such IMs may interact with autonomous or semi-autonomous vehicles as they approach an intersection to identify a safe and efficient means by which to traverse the intersection, such as, for example, an appropriate lane of travel, appropriate timing and velocity, etc.

Rather than being controlled bi-directionally as is done with a present-day traffic light or necessitating the autonomous automobile stopping as is done with present day stop-signs, an automated intersection manager is capable of scheduling intersection crossings by vehicles in a far more efficient manner.

While solutions have been proposed, they remain flawed because they are based on simulations that operate within a perfect theoretical construct. Unfortunately, as these previously proposed management techniques are implemented in a real system (or within a scale model as described in greater detail below) the previously proposed management techniques encounter real-world failure modes not accounted for by the simulations.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Figure 1:
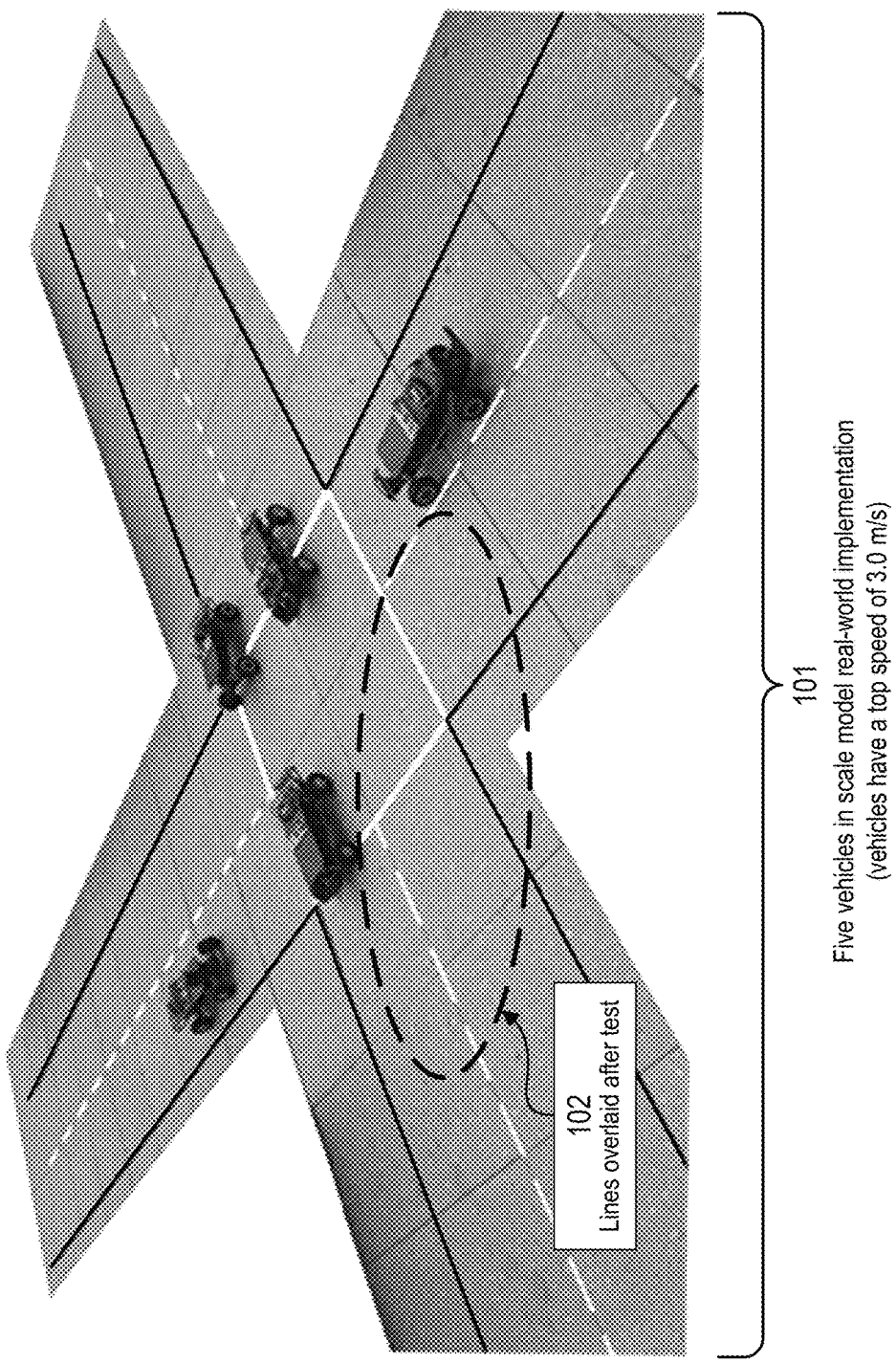
FIG. 1 depicts an exemplary scale real-world implementation of autonomous intersection management in accordance with various embodiments.

Various embodiments for apparatus, systems and methods for time-sensitive autonomous intersection management are described.

In embodiments, an apparatus for intersection management of autonomous or semi-autonomous vehicles may include an input interface to receive intersection crossing requests from one or more autonomous or semi-autonomous vehicles, the requests including vehicle data. The apparatus may further include an output interface coupled to a transmitter, and an analyzer coupled to the input interface and to the output interface to: process the intersection crossing requests to generate a command including a crossing velocity and a time at which to assume the crossing velocity, and to cause the transmitter, via the output interface, to transmit the command to a requesting vehicle.

In embodiments, a crossing request may be sent upon a vehicle passing a request line a distance ahead of the intersection.

In embodiments, the apparatus may be provided in an autonomous intersection manager (IM).

In embodiments, the vehicle data may include vehicle identification, input/output lane of travel, velocity, and time-stamp/position pair at the time of crossing the request line.

In embodiments, a crossing request from a vehicle may be preceded by a time synchronization request, and the analyzer may further generate a time synchronization command and cause the transmitter to transmit it to the vehicle.

In embodiments, a crossing request from a vehicle may follow a time synchronization message sent by the apparatus, and the analyzer may further generate the time synchronization message and cause the transmitter to transmit it to the vehicle.

In embodiments, the vehicle may first request the time synchronization message.

In embodiments, the apparatus may further include a memory coupled to the processor, to store one or more algorithms to be used by the analyzer.

In embodiments, the apparatus may further include the transmitter, and a receiver coupled to the input interface.

In embodiments, at least one of: the apparatus is disposed in an autonomous intersection manager (IM); or the apparatus is integrated with the autonomous intersection manager. In embodiments, the intersection manager may be provided at an intersection.

In embodiments, to generate a command may include to provide a crossing velocity and a specified time, and may further include to check for conflicts between the requesting vehicle's trajectory and the trajectories of other vehicles already past the request line.

In embodiments, to generate a command including a crossing velocity and a specified time may further include to calculate a Time of Arrival (ToA) and an execution time ($T_E$) for the requesting vehicle, and to send it to the requesting vehicle.

In embodiments, the apparatus may further include a clock, coupled to the analyzer, to provide an accurate time signal to the apparatus, to use in issuing one or more synchronization commands or intersection crossing commands, to requesting vehicles.

In embodiments, a method of crossing through an intersection managed by an autonomous intersection manager (IM) performed by an autonomous or semi-autonomous vehicle, may include receiving an instruction to synchronize a vehicle clock from an intersection manager (IM) of an intersection; synchronizing the vehicle clock in response to the instruction; upon traversing a request line ahead of the intersection, sending a request to the IM to cross through the intersection, the request including vehicle data; receiving a response from the IM, the response including a new velocity and a time at which to assume the new velocity; and conforming its velocity to the new velocity within the specified time and traversing the intersection at the new velocity.

In embodiments, the vehicle data may include vehicle identification, input/output lane of travel, velocity, and time-stamp/position pair at the time of crossing the request line.

In embodiments, the method may further include requesting the synchronization instruction from the IM.

In embodiments, the response from the IM may further include the vehicle's Time of Arrival (ToA) and an execution time ($T_E$), as calculated by the IM, and in embodiments the method may include tracking the execution time and assuming the new velocity upon reaching the execution time.

In embodiments, there may be an intersection management system, including an intersection manager (IM) and a plurality of autonomous vehicles. In such embodiments, the plurality of autonomous vehicles may be each individually communicatively linked with a transceiver of the intersection manager. In such embodiments each of the plurality of vehicles are to synchronize their respective clocks to a clock of the IM. In such embodiments each vehicle may transmit a request to the IM to cross the intersection, the request submitted upon the vehicle crossing a request line. In embodiments, the request may include vehicle identification, input/output lane of travel, velocity, and time-stamp/position pair at the time of crossing the request line. In such embodiments, in response to the request the IM may assign to the vehicle a specified time to assume a new velocity through the intersection, and transmit a response to the vehicle with the specified time and the new velocity.

In such embodiments, when the vehicle receives the response with the specified time and the new velocity, it may assume the new velocity at the specified time as assigned by the IM, and traverse the intersection at the new velocity as assigned by the intersection manager.

In the description to follow, reference is made to the accompanying drawings which form a part hereof wherein like numerals (or, as the case may be, the last two digits of an index numeral) designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit) ASIC (an electronic circuit, a processor) shared, dedicated, or group (and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As used hereinafter, including the claims, the terms "module", "intersection controller", "intersection manager" "analyzer" and/or "communications facilities", may refer to, be part of, or include one or more Application Specific Integrated Circuits) ASIC (electronic circuits, programmable combinational logic circuits (such as field programmable gate arrays (FPGA)) programmed with logic to perform operations described herein, a processor) shared, dedicated, or group (and/or memory) shared, dedicated, or group (that execute one or more software or firmware programs generated from a plurality of programming instructions with logic to perform operations described herein, and/or other suitable components that provide the described functionality.

As used herein, the term semi-autonomous vehicle is synonymous with computer-assisted driving of a vehicle. The term does not mean exactly 50% of the driving functions are automated. The percentage of automated driving functions may vary between 0% and 100%. In addition, it will be appreciated the hardware, circuitry and/or software implementing the semi-autonomous driving may temporarily provide no automation, or 100% automation, such as in response to an emergency situation. For ease of illustration, the following non-limiting example use cases for mobile devices and autonomous vehicles are relevant to, and addressed by, various embodiments of the invention.

Described herein are systems, methods, and apparatuses for implementing time sensitive autonomous intersection management. For example, there are described in accordance with certain embodiments, an intersection management system, having therein an intersection manager and a plurality of autonomous vehicles. According to such an embodiment, the intersection management system further includes a plurality of autonomous vehicles, each being individually communicatively linked with a transceiver of the intersection manager; in which each of the plurality of vehicles are to synchronize their respective clocks to a clock of the intersection manager; in which each vehicle to transmit a request to cross the intersection, the request being submitted to the intersection manager upon crossing a request line by initiating a communication to the intersection manager informing the intersection manager of the vehicle identification, input/output lane of travel, velocity, and timestamp/position pair at the time of crossing the request line; in which the intersection manager is to receive the request to cross the intersection from a vehicle and assign to the vehicle a specified time to assume a new velocity through the intersection; in which the intersection manager is to transmit a response to the vehicle with the specified time and the new velocity; in which the vehicle receives the response with the specified time and the new velocity and starts executing an instruction to assume the new velocity at the specified time as assigned by the intersection manager; and in which the vehicle traverses the intersection at the new velocity as assigned by the intersection manager.

It is noted that for autonomous or semi-autonomous vehicles, intelligent autonomous intersection management provides for safe and efficient operation of an intersection. In order to achieve safe operation despite uncertainty in a vehicle's trajectory, intersection management techniques consider a safety buffer around the vehicles. For increased safety, the safety buffer accounts for the network and computational delay caused by communication between the Intersection Manager and the automobile required by the vehicle to request entry and receive a reply.

Unfortunately, modeling a worst-case computation and network delay as an additional safety buffer can degrade the overall throughput of the intersection and may also account for yet unforeseen corner cases which exhibit a delay beyond the modeled worst-case delay.

To avoid this problem, one approach is for an intersection manager to adopt a query-based approach, in which the intersection manager only provides a yes/no answer to a vehicle's queries of speed and arrival time. Such a solution does not degrade the position uncertainty for vehicles. However, the approach greatly increases network traffic, increases the computational demands on both the car and the intersection manager, and may ultimately result in poor intersection throughput.

Conversely, the systems, methods, and apparatuses for implementing time sensitive autonomous intersection management according to various embodiments, provide means by which to program the interface of both a vehicle and intersection manager, without requiring additional buffer to be modeled around a vehicle to account for the effect of network and computational delay. Such a time sensitive autonomous intersection management technique therefore enables efficient intersection management through the realization of both increased safety and improved intersection throughput.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments hereof also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

It is noted that the algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary scale real-world implementation 101 in accordance with described embodiments. The scale model was used by the inventors to perform tests relating to various embodiments. With reference to FIG. 1, there are depicted five (5) example autonomous vehicles, each having a top speed of 3.0 m/s traversing a model intersection. It is noted that lines 102 were overlaid subsequent to the testing so as to better indicate the lanes of travel.

The 1/10 scale model test intersection of FIG. 1 utilized TRAXXAS RC cars to demonstrate that a time-sensitive programming based approach, as described herein, obviates any need for large buffers around the vehicles to accommodate network and computation delay. Results from testing of the model vehicles additionally demonstrated a reduction in average wait time for the vehicles at a single-lane intersection by 24%.

As vehicles become autonomous or even semi-autonomous, intersections are no longer constrained by the humans that drive them. Rather, so called automated Intersection Managers (IMs) may make intersections safer and more efficient by interacting with the autonomous vehicles as they approach the intersection to identify a safe and efficient means by which they may traverse the intersection.

It is noted that there are several possible methodologies for intersection management. One of them, a Velocity Transaction Intersection Manager (VT-IM) methodology, requires vehicles to announce their arrival to the IM and the IM then provides them with a prescribed velocity that they are to follow through the intersection, thus ensuring both safe and efficient operation of the intersection.

For safety reasons, when utilizing the VT-IM methodology, when calculating the position of a vehicle, a safety buffer around the vehicle is needed, to account for the uncertainty in the position and velocity of the vehicle.

This uncertainty in the position and speed of the vehicle may vary due to a variety of reasons, including, for example, errors in sensors and actuators, errors or lack of fidelity within data fusion algorithms, and even errors due to a lack of clock synchronization or time drift between the vehicle and the IM.

Safety buffer calculations are therefore provided for the VT-IM approach to take into account such errors. Further, an even greater safety buffer is generally additionally provided to account for network and computation delays related to the interaction between the vehicle and the IM. Such network delay introduces variable lag in delivering information to the IM and then back to the vehicle and computational delay is also introduced due to the time require for the IM to compute the correct response to send back to the vehicle.

Together these network and computation delays compose a total RTD (Round Trip Delay). Neglecting RTD makes the VT-IM scheduling methods vulnerable to uncertainties and may lead to traffic collisions.

It is noted that exemplary safety buffers correspond to a worst-case RTD. To test the effects of error and worst-case RTD, the ⅒ scale intersection model was used. In one particular test, the model utilized eight TRAXXAS RC cars setup for autonomous driving with a top speed of 3.0 m/s and a length and width of 568 mm by 298 mm respectively. The cars communicated with the IM NRF24L01+, 2.4 GHz serial network adapters. For the intersection setup, the worst case safety buffer for any vehicle due to the control and clock error was found to be approximately 78 mm, while the buffer due to the round trip delay was about 450 mm—resulting in a very significant vehicle buffer necessitated by the round trip delay accommodations.

It is noted that with actual vehicles, having improved actuators and sensors, the error may be smaller due to higher quality components. However, at the same time, the safety buffer due to round trip delay may be much larger due to a longer communication distance of the vehicle with the IM, and higher still at intersections experiencing higher volumes of traffic.

Adding such large safety buffers, although necessary for VT-IM scheduling methods, may severely degrade the performance of traffic management at intersections. One way to avoid having the large safety buffer is to use a Query-Based IM (QB-IM) design such as the AIM methodology.

Using a QB-IM methodology, as the vehicle approaches an intersection at a constant speed, the vehicle sends a speed query to the IM, and the IM only replies with a yes/no answer. If the answer is yes, the vehicle can continue moving with its current speed, and if the answer is no, the vehicle must slow down to a lower speed, and makes another request.

In such manner, the QB-IM approach eliminates error in the position of the vehicle due to round trip delay, and therefore, an extra safety buffer is not required. However, using the QB-IM approach leaves little room for the IM to optimize the traffic at the intersection, as the QB-IM design cannot solve an optimization problem and send the result to the vehicles. Rather, an IM utilizing such an QB-IM approach is limited to giving only a yes/no answer to achieve safety. Ultimately, any QB-IM approach will increase network traffic and increase the computational burden on both vehicles and IM, consequently resulting in poor intersection throughput.

To solve the RTD related extra safety buffer problem correctly—without increasing the computational burden on the vehicle, and while preserving the ability of the IM to perform traffic optimizations—a time-sensitive programming means is herein described. This approach enables the programming of an IM without requiring any additional buffer due to round trip delay. Various embodiments of such an approach are disclosed herein.

It is noted that using the time-sensitive methodology for an IM solves the extra safety buffer problem by fixing the action time of the new speed received by the vehicle such that the position of the vehicle becomes deterministic.

The ⅒ scale model of FIG. 1 was designed to test several traffic scenarios, including testing two distinct intersection management techniques. Specifically tested were a VT-IM technique (Velocity Transaction Intersection Manager) which requires the extra safety buffers, and the time sensitive intersection management technique (TS-IM) which does not require, and therefore can wholly eliminate, additional safety buffers to address RTD.

Because the TS-IM methodology eliminates the safety buffer, average slow downs of vehicles traversing the intersection were seen, in various tests, to be reduced by 16% and worst case slow downs of vehicles traversing the intersection were seen to be reduced by 24%.

In other testing by the inventors, all three intersection management techniques were implemented in a Matlab simulator to study the scalability of these varying approaches. Specifically, the VT-IM, QB-IM and TS-IM techniques were modeled and simulated. The Matlab simulations were performed using randomly generated cars for different input flow rates. Results from the simulations showed that at low input rates, all techniques perform nearly identically. However, as input rates increase, the throughput of VT-IM technique drops sharply. The QB-IT was seen, in these simulations, to perform better, but the TS-IM approach performed better still, and also scaled to higher input flows very well.

On average over all input flows, in the simulations run by the inventors, the time sensitive approach exhibited a 1.62× better throughput (as measured by the number of cars per second over the average delay per car) when compared with the velocity transaction intersection management technique, and 1.36× better when compared with the query-based intersection management technique. It was also seen that performance overhead and network traffic of the TS-IM and VT-IM techniques were up to 20× lower than the QB-IM technique.

Figure 2:
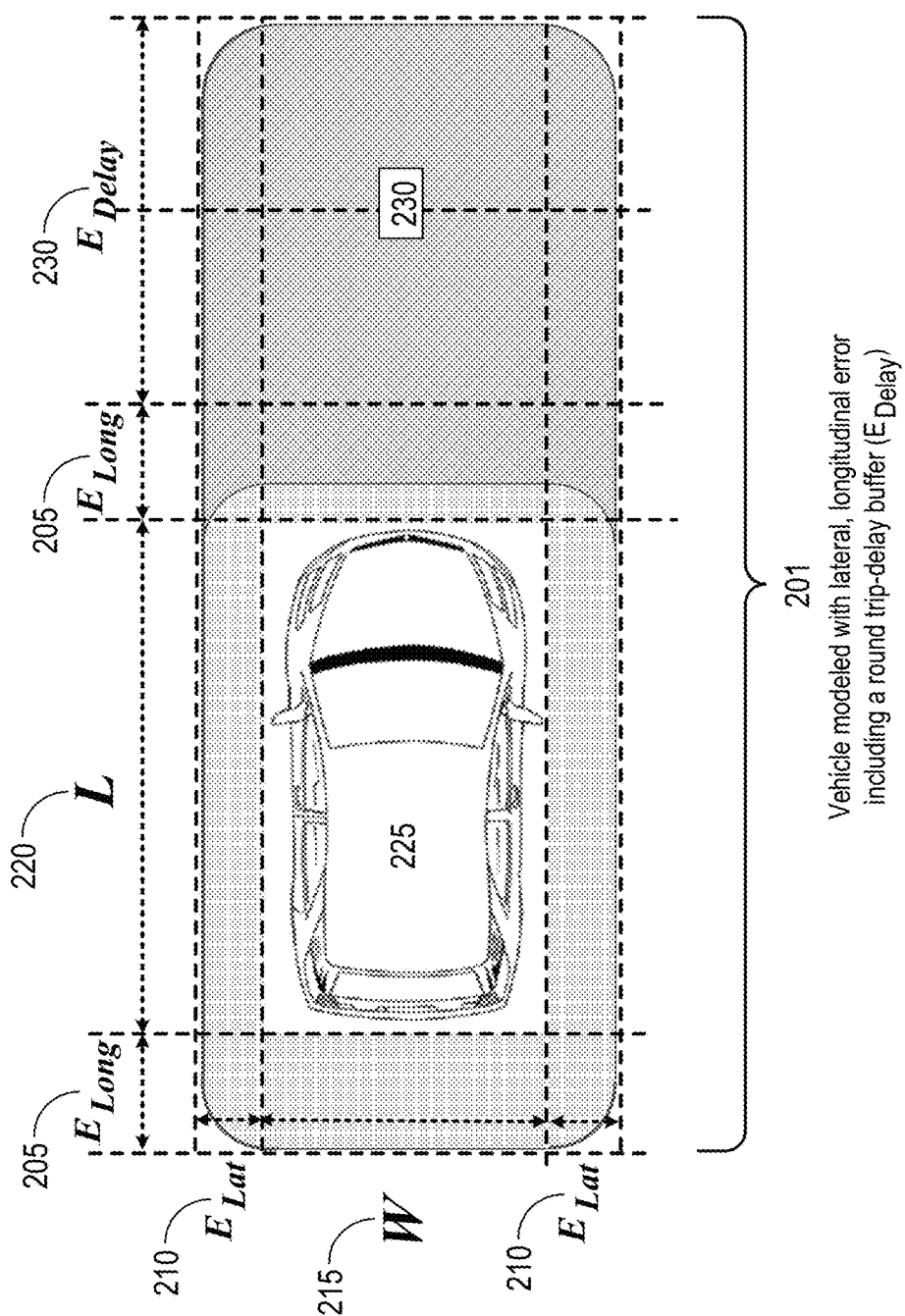
FIG. 2 depicts a model of an exemplary vehicle a with lateral error ($E_{Lat}$) and a longitudinal error ($E_{Long}$) forming a greater error buffer in both length (L) and width (W) than the actual dimensions of the vehicle.

FIG. 2 depicts a model 201 of an exemplary vehicle 225 with lateral error ($E_{Lat}$) 210 and longitudinal error ($E_{Long}$) 205 forming a greater error buffer in both length (L) 220 and width (W) 215 than the actual dimensions of vehicle 225. Further depicted here is $E_{Delay}$ 230 providing an additional longitudinal length of the buffer 230.

It is here noted that most intersection management techniques have been developed primarily, or solely, as the case may be, on simulators, and therefore, timing and error related problems which are exhibited in real-world physical models were not encountered. Thus, these techniques may cause catastrophic problems, as they fail to address a fundamental timing issue brought about by both computational and communication delays. Moreover, without addressing such delays systemic automobile collisions could result.

In order to test the effectiveness of intersection management policies on a physical intersection, the 1/10 scale model, described above, as depicted at FIG. 1, was utilized. It used a 4-way intersection with one lane per road. The size of the model intersection of FIG. 1 is 1.2×1.2 m² and the example test vehicles' length and width were 0.568 m and 0.296 m, respectively.

As modeled, each vehicle starts communicating with the IM when crossing a designated transmission line. The distance between intersection and the designated transmission was set at 3 m, and the maximum velocity of the example cars was limited to 3 m/s.

Utilizing TRAXXAS Slash RC RWD (rear wheel drive) vehicles for the chassis, in the testing stock motors were exchanged with smaller motors having built in quadrature encoders for fine-grain feedback control. In the example tests, Arduino Mega 2560s were used as the central control unit of the vehicles and Arduino Nanos were utilized to monitor the quadrature encoders for localization of the vehicles. Bosch BN0055 9DOF sensor fusion IM IMUs were used for steering feedback. For wireless communication, NRF24L01+, 2.4 GHz serial network adapters were utilized.

In the testing, vehicle interaction with the IM was implemented as a state machine having four (4) distinct states, including: (1) an arriving state in which the vehicle is in the arriving state before it reaches the transmission line; (2) a sync state in which the vehicle enters the sync state once it reaches the transmission line and registers with the IM and sends a sync request to the IM. During the sync state, the IM sends time synchronization data (e.g., based on NTP or a local synchronization clock of the IM) to the vehicle. A third state was the (3) request state, in which the vehicle, once the time sync is achieved, transmits a packet of data to the IM requesting to cross the intersection. After processing the requests ahead in a FIFO queue, the IM computes the response for the vehicle and sends it to the vehicle, for example, the response including an instruction to proceed at a particular speed upon reaching a designated time. Lastly, a fourth state is the (4) follow state in which the vehicle, once it receives the plan from the IM, then proceeds to follow or execute the plan, such as assuming the stated speed at the time specified by the IM. The vehicle then follows the plan (e.g., traveling at a specified velocity) and concludes by sending an exit timestamp to notify the IM of its exit from the intersection crossing, at which point the vehicle returns to the arriving state for the next intersection.

Using such an exit timestamp allows tracking of wait time for each vehicle during every crossing.

With this model intersection, different IMs were implemented and executed on an example laptop computer having 10 Gb of memory and a Core i7-3517u @1.9/2.4 GHz CPU and executing a Windows 8.1 64-bit operating system. The IMs were coded utilizing Matlab R2016.

As seen in the testing, resultant communication between the vehicles and the IM involved an exchange of about 44-bytes of data for each vehicle. In some rare cases, when a re-transmit occurred due to a communication timeout, an overhead of 24 bytes per re-transmit was seen. It is noted that in any real system (e.g., not a simulation), there will always be uncertainties and inaccuracies in identifying the exact state of the system. For the purposes of the testing model, the position and velocity of the vehicles represent such uncertainty. Uncertainty in the state of the system may be due to any of several reasons, including sensor errors, such as the position and speed sensors, errors due to state estimation algorithm used attributable to GPS and IMU sensors utilized to estimate the position and the velocity of the vehicle, sensor fusion algorithms which may affect the accuracy of the position and velocity, and differences in the clocks of the different components of the system due to clock drift or latency resulting in a synchronization error between the IM and the vehicle despite the synchronization event.

To achieve safe operation of the intersection, a safety buffer must be modeled around the vehicles. The safety buffer implies that the position of the actual vehicle can be anywhere within the buffer, and the movement of the vehicles must be planned/implemented such that the safety buffers do not overlap at any moment in time. However, such a buffer may be significantly smaller if RTD of communications between the vehicles and the IM need not be addressed.

Figure 3:
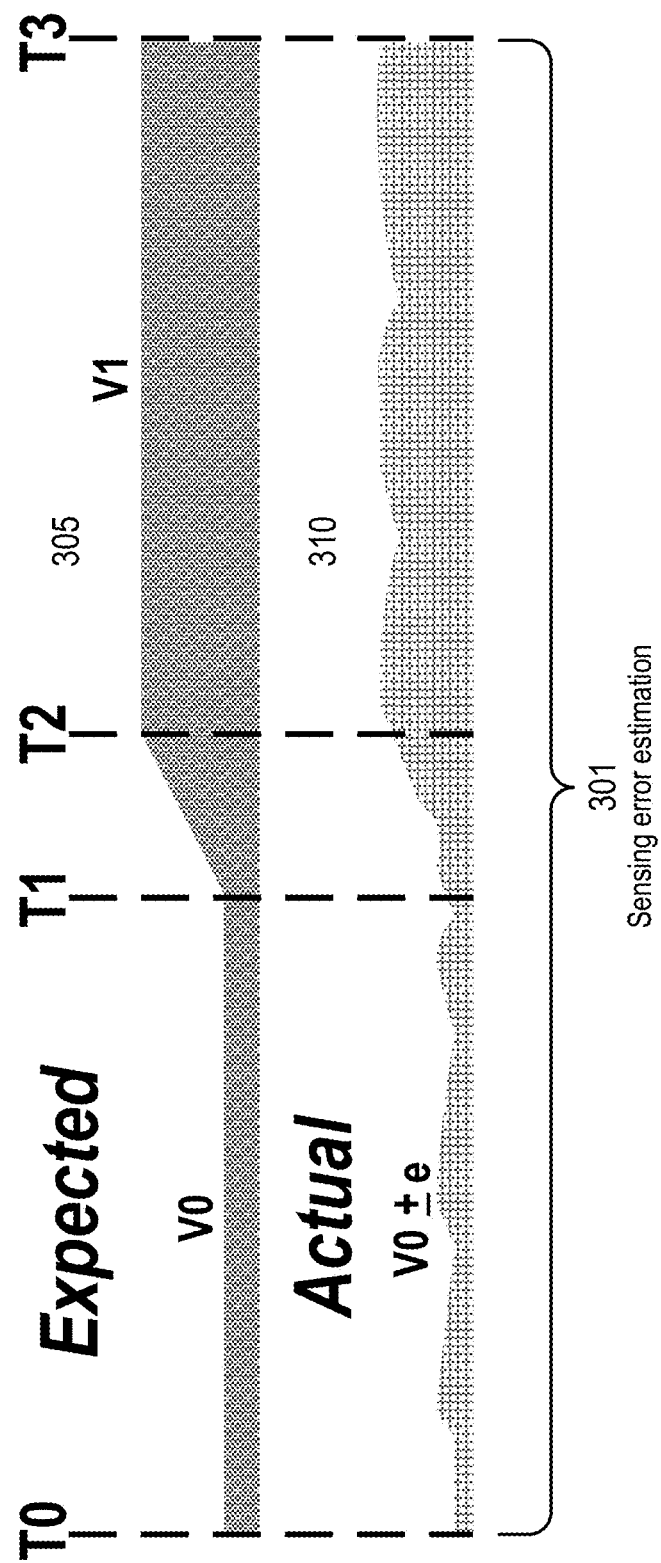
FIG. 3 depicts exemplary means by which to estimate sensing error in accordance with various embodiments.

FIG. 3 depicts an exemplary method to estimate sensing error 301 in accordance with various embodiments. In particular, the depicted graph shows expected velocity 305 versus actual velocity 310, where the difference between them is due to control algorithm errors and sensor errors.

It is noted that real world vehicle positioning is based on acquired measurements from sensors, so an IM design according to various embodiments must take into account the error propagated from, for example, GPS, encoders, etc., in which encoder errors affect the vehicle longitudinally while GPS errors affect a vehicle both laterally and longitudinally.

Although it may be possible to estimate the size of a safety buffer around vehicles using error numbers from sensor data sheets, it nevertheless remains difficult to estimate the effect of data fusion and control algorithms errors on the needed buffer size. Therefore, an experiment to estimate the error in the overall position and velocity of the car was devised and run, and utilized to estimate buffer size.

As depicted in FIG. 3, the experiment began with an example test vehicle at a position $P_0$ (not shown), with velocity $V_0$, at start time $T_0$. The vehicle then attempted to hold velocity $V_0$ until reaching time $T_1$. At time $T_1$ the vehicle accelerated until it reached velocity $V_1$ at time $T_2$. The vehicle then maintained velocity $V_1$ until time $T_3$, as shown. Ideally, then, the vehicle should have reached a position $P_3$ (not shown) at time $T_3$. In such a case, the error in the final position will be $E_{Long}=P_3-P_{actual}$. The worst-case positive control error was seen in the model when $V_0=0.1$ m/s and $V_1=3.0$ m/s, and the worst case negative error was seen when $V_0=3$ m/s and $V_1=0.1$ m/s. Using the worst case of these two tests, and referring to the error modelling shown in FIG. 2, it was possible to determine an outer bound of longitudinal error $E_{long}$, which was used to determine safety buffer dimensions.

The experiment was performed twenty times, measuring $E_{long}$ in which a maximum value of $E_{long}$ as 50 ms was seen. Therefore, at maximum speed, a buffer due to vehicle control error would be 75 mm.

In embodiments, a physical implementation may be a distributed system containing multiple nodes communicating with a central server. Without proper synchronization, commands given to nodes can be executed at different times, depending on when the command is received. Thus, in embodiments, synchronization may be used to ensure that vehicles and the IM have the same time understanding among all nodes. In embodiments, different time synchronization methods such as, for example, NTP, PTP, GNSS, etc. may be utilized in order to synchronize with the server.

Utilizing NTP time synchronization in various tests run by the inventors, the error was well defined and was seen to be within 1 millisecond over the course of the tests. Therefore, at maximum speed, the buffer due to a time synchronization error was seen to be 3 mm. Overall, a safety buffer of size 78 mm was needed to be added to the front and back of the vehicle to account for the inaccuracy in the position. The lateral error (along the width of the lane) can be disregarded because it is less than the lane width and therefore does not affect any calculations.

In embodiments, the following scheduling algorithms may be used. A first algorithm may be implemented in a vehicle, and a second algorithm may be implemented at an IM, in accordance with various embodiments.

In embodiments, a vehicle based scheduling algorithm, Algorithm 1, may be implemented as follows:

```
If transmission line is crossed then
    send a request to the IM;
    receive a response from the IM including a command;
    execute the received command;
end.
```

Similarly, in embodiments, an IM based scheduling algorithm, Algorithm 2, may be implemented as follows:

```
If a request is received from a vehicle then
    V= calculate( );
    Send(V);
end.
```

It is here noted that VT-IMs operate in a manner such that when a vehicle makes an intersection crossing request, the IM calculates an optimal speed and sends the speed value back to the vehicle. Next, the vehicle receives and executes the command. Thus, algorithms 1 and 2 depict how the IM and vehicles approaching an intersection may collaborate with one another.

While VT-IMs provide high throughput by adopting first come first served (FCFS) or other scheduling algorithms, it is noted that VT-IMs neither consider nor take into account computational delay caused by the IM, or network delay due to communication between the vehicles and the IM. Neglecting such delays affects system correctness, because, in this methodology a vehicle simply executes a received velocity command as soon as it is received, and consequently executes the IM's command at a non-deterministic time and position.

Figure 4:
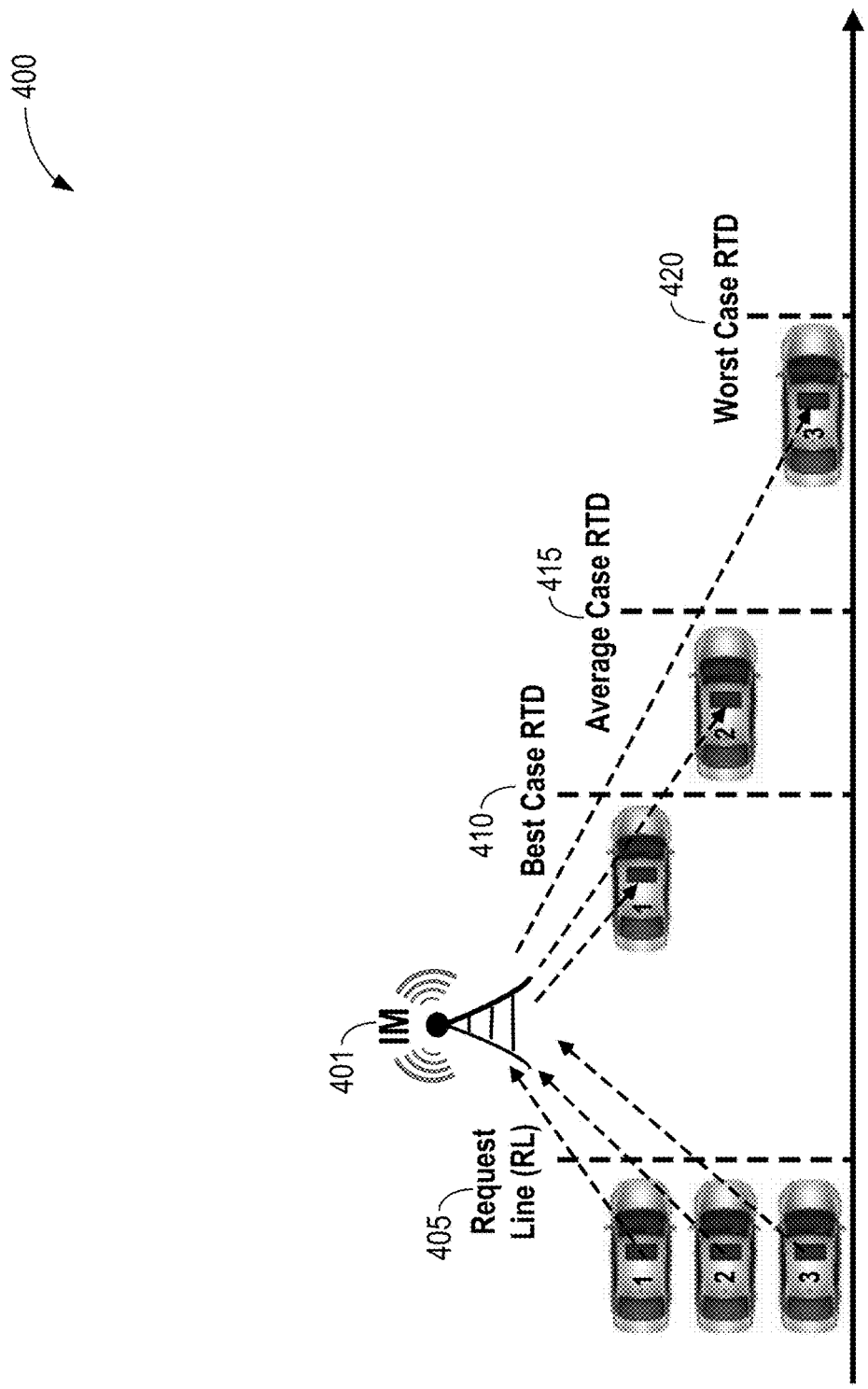
FIG. 4 illustrates how round trip delay (RTD) between an example intersection manager (IM) and various vehicles may affect the position of the vehicles relative to a request line of an intersection.

FIG. 4 depicts how RTD between an example IM 401 and example vehicles 1, 2 and 3 may affect vehicle position. As shown in FIG. 4, in order to achieve safe operation, an extra safety buffer around each vehicle is added to take into account a worst case round trip delay 420. As noted above, RTD may include both computation delay and communication delay. Computation delay is understood as the amount of time it takes for an IM to compute the information that a vehicle needs. It is noted that compute time is generally longest when the number of requests in the IM's queue is large, and as a result a worst case round trip delay 420 may be defined as when four vehicles arrive at request line 405 at the exact time, one in each of the four directions (other three directions not shown in FIG. 4). In experimental tests conducted by the inventors, a worst-case round trip delay from 10 tests with four car arrivals was seen to be 135 milliseconds. The best case round trip delay 410, and average case round trip delay 415, were seen, in these example tests, to be significantly less.

It is here noted that network delay is understood to be the time required to send information back and forth between a vehicle and an IM, assuming that any computations performed on the IM are instantaneous. In order to measure network delay, each request message may be followed by an acknowledge message from the receiver. By then subtracting the time the message is sent from the time that the ACK (acknowledgment) message is received, network delay for that message may be determined. For the 2.4 GHz wireless devices utilized by the physical $\frac{1}{10}$ scale model used in testing performed by the inventors, network delay was seen to be 15 milliseconds.

Round trip delay may, for this testing example, therefore be bounded at 150 milliseconds, being the sum of worst case RTD 420, as shown in FIG. 4, of 135 ms, and a network delay of 15 ms, as described above. At maximum speed, the 150 ms delay equates to an extra 0.45 m length being added to the front and back of the vehicle. With the worst-case round trip delay bound and a safety buffer added in, modeled vehicles with their safety buffers are 3.46× longer longitudinally than the vehicle's actual physical size. In order to guarantee the safety of the vehicle, a Worst-Case Computational Delay (WCCD) may be further considered based on a worst case scenario.

It is noted that a QB-IM approach may use the following query based (QB) algorithms, a first for the IM and a second for requesting vehicles. The first QB algorithm, Algorithm 3, may be as follows, and it is the same as scheduling algorithm Algorithm 2 provided above:

```
If a request is received from a vehicle then
    V= calculate( );
    Send(V);
end.
```

There may be another a vehicle based query algorithm, Algorithm 3, implemented as follows:

```
If designated line is crossed then
    send a request to the IM;
    receive a response from the IM;
    if Approved then
        continue driving;
    else
        slow down and prepare to stop;
        request again after a timeout;
    end
end.
```

It is noted that one possible query based IM may utilize a First Come First-Served (FCFS) intersection management policy that mitigates the effect of Worst Case Round Trip Delay (WCRTD) by having the incoming vehicles, as they reach a designated line, send requests to an IM indicating their arrival time and velocity. The IM then simulates the trajectory of the vehicle in the intersection and responds to the requesting vehicle with an approval if the trajectory has no overlap with the reserved spots occupied by other vehicles. If the request is rejected, the vehicle prepares to stop before the intersection line, which creates unnecessary delay, and inefficient intersection throughput.

Thus, such a methodology may be less than optimal. There may be a high computational load due to processing multiple requests and performing a simulation for each request as well as extra communications overhead. This is because when a request is rejected, the vehicles must then initiate a new request. Consequently, such a methodology may have difficulty achieving maximum throughput (of vehicles through the managed intersection) because it simulates the trajectory for only two speeds (current and maximum).

Figure 5:
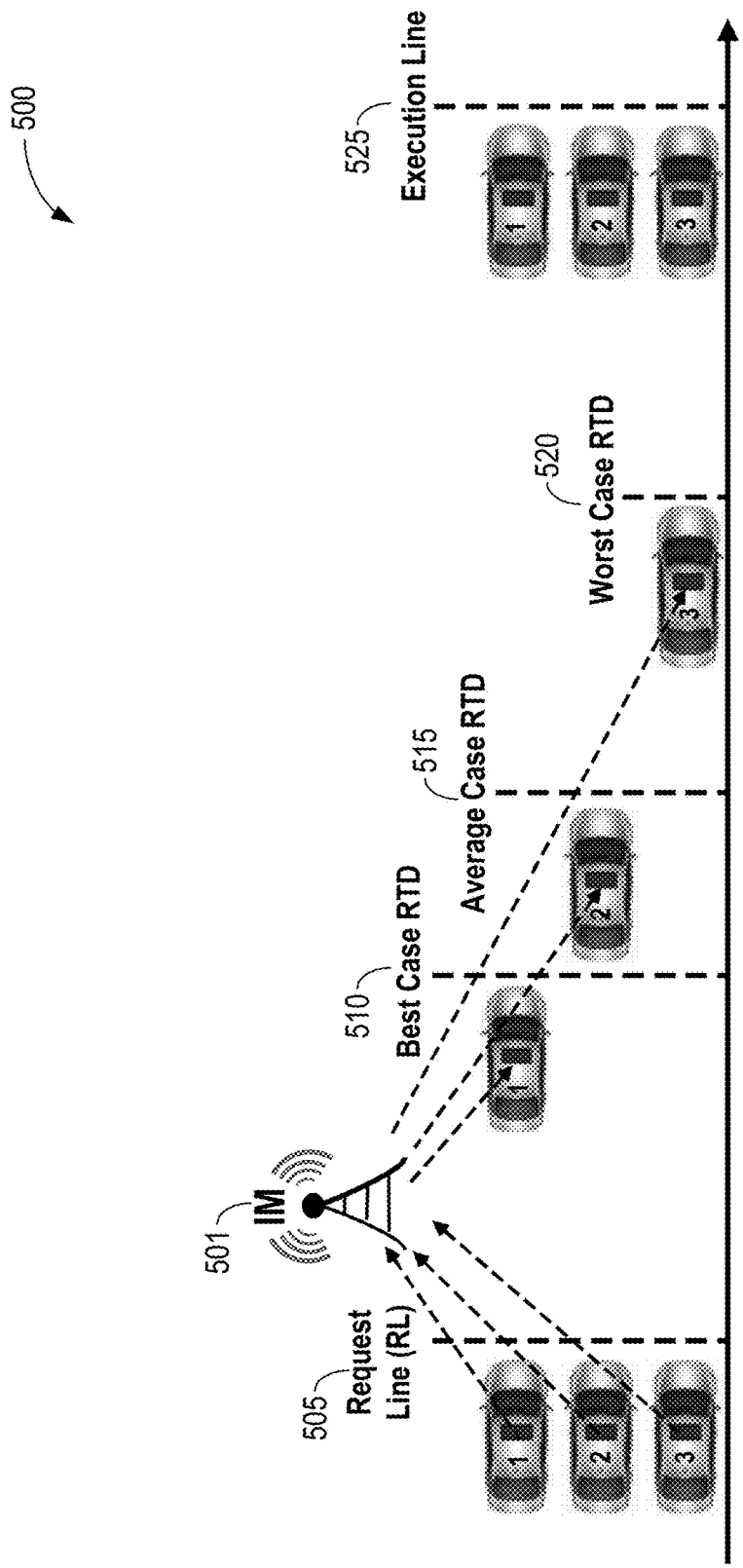
FIG. 5 depicts a time-sensitive methodology for vehicles receiving commands from an IM with differing round trip delays.

FIG. 5 depicts a time-sensitive methodology for vehicles receiving commands from IM 501 with differing round trip delays, according to various embodiments. In order to cancel the effect of round trip delay, in time-sensitive methodology a worst case RTD 520 may be treated, for example, as a delay in command execution. FIG. 5 therefore illustrates three different scenarios, which may occur in various embodiments, in which a first vehicle exhibits a best case round trip delay at 510, a second vehicle exhibits an average case round trip delay at 515, and finally the third and last vehicle exhibits the worst case round trip delay at 520. However, all vehicles 1, 2 and 3 begin executing their received commands at a known time and position, specifically at the execution line 525 (which is some distance ahead of a worst case RTD position), notwithstanding the varying round trip delays 510, 515, and 520 experienced by the disparate vehicles.

As shown in FIG. 5, in embodiments, as each vehicle crosses designated request line 505, that vehicle may send a request message to IM 501, in response to which IM 501 may calculate a desired Time of Arrival (ToA) for the requesting vehicle, as well as an execution time $T_E$, and an actuation position $P_E$, based on the worst case RTD 520 known for a specific intersection setup and vehicle. IM 501 may then return the computed execution time $T_E$ and actuation position $P_E$ to the vehicle. After receiving the message, in embodiments, the vehicle may then compute its own trajectory based on time of arrival and the provided execution time $T_E$ from the IM. In embodiments, the vehicle may track execution time $T_E$ and may then perform according to the IM's plan (e.g., by adopting the new velocity) upon reaching execution time $T_E$, which also corresponds deterministically to a known position, here referred to as execution line 525.

Figure 6:
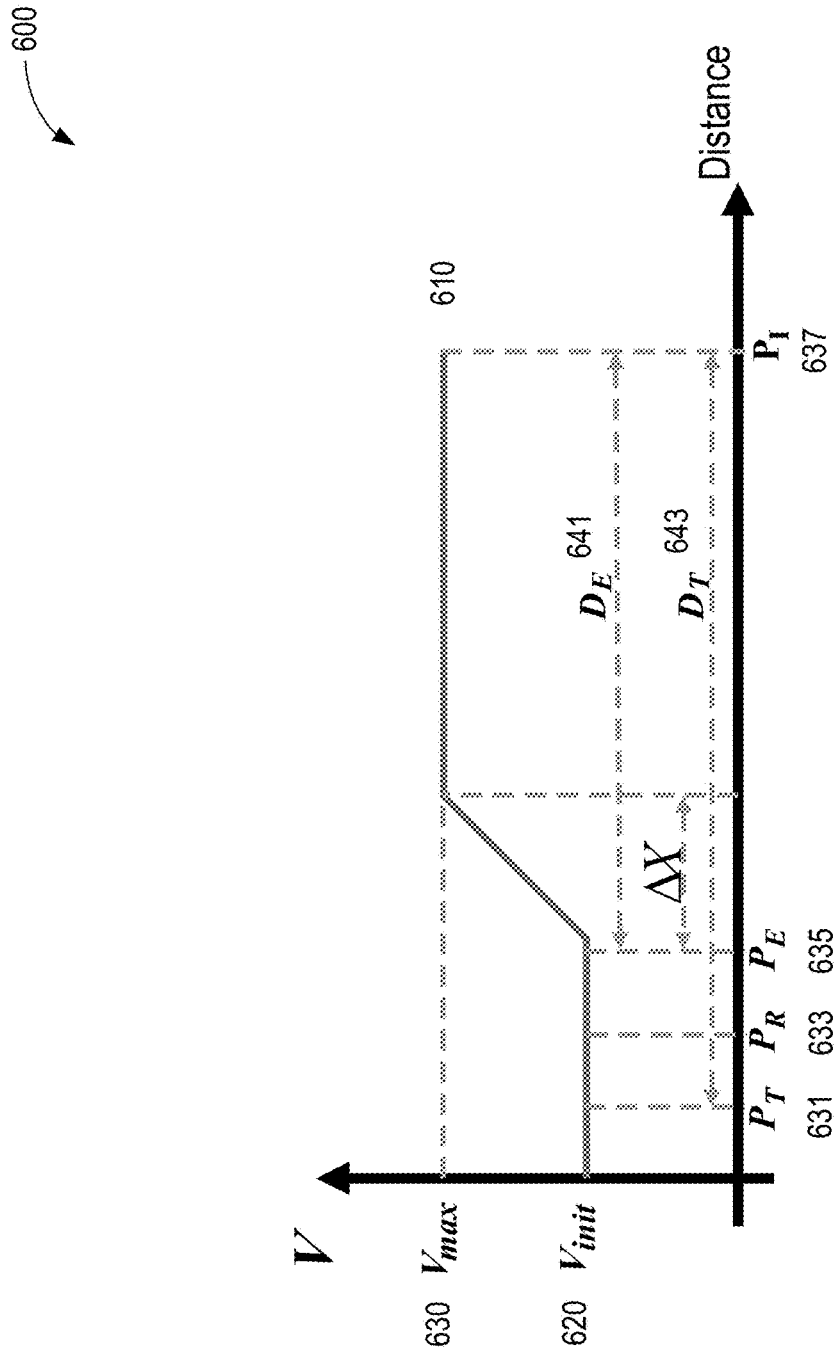
FIG. 6 depicts an exemplary vehicle trajectory based on maximum acceleration, in accordance with described embodiments.

In embodiments, an IM may use the following Time Sensitive algorithm, which refers to quantities and concepts described above in connection with FIG. 5, and as further described, in connection with FIG. 6. As used herein, "time sensitive" refers to not only an IM providing a requisite speed through the intersection to a requesting vehicle, but also providing the vehicle with a definite time for the vehicle to assume that new speed (e.g., once the vehicle has reached execution line 525). This additional "time sensitivity" distinguishes approaches according to various embodiments. The example algorithm is as follows:

```
If a request is received then
    calculate T_E and ToA;
    send back T_E and ToA (to the requesting vehicle);
    add the vehicle to the list;
end
if an Exit notification is received then
    remove the vehicle from the list;
end.
```

FIG. 6 depicts an exemplary vehicle trajectory 600 based on maximum acceleration, in accordance with various embodiments. The trajectory shows distance and velocity of an example vehicle at a managed intersection. With reference to FIG. 6, the example vehicle transmits a request message to an IM at a position $P_T$ 631 and receives a response from the IM at a position $P_R$ 633. Then, the vehicle begins to execute the IM's command, which is included in the response received by the vehicle at position $P_E$ 635. Although not shown in FIG. 6, each position shown on the distance axis corresponds to a time. Thus, $T_T$ represents the time at which the vehicle was at transmit position $P_T$. The vehicle starts executing the command at the time it reaches $P_E$, the execution point, at time $T_E$. Given such a trajectory for an example vehicle, in embodiments, an IM may check for conflicts between a current (e.g., newly approaching the intersection) vehicle's trajectory and the trajectories of vehicles already present in the intersection. In embodiments, a safe time of arrival for existing vehicles may be further calculated based on a kinematic equation of vehicles, and an earliest arrival time may be selected and assigned to the vehicle. It may be that the calculated time of arrival for the current vehicle may not be achievable depending on execution time $T_E$, time of arrival, maximum acceleration $a_{max}$ and maximum deceleration $d_{max}$. Therefore, in embodiments, the IM may additionally check the calculated time of arrival based on the longest acceleration time $T_{Acc}$, $$T_{Acc} = \frac{V_{max} - V_{init}}{a_{max}},$$

where $V_{init}$ is an initial speed of the vehicle. Then, the earliest time of arrival may be calculated as $$EToA = T_{Acc} + \frac{V_{max}}{D_E - \Delta X},$$

where $\Delta X$ is acceleration distance as $\Delta X = (0.5 a_{max} T_{Acc}^2 + V_{init} T_{Acc})$ and $D_E$ is the distance between the intersection line (e.g., at position $P_I$ 637) and the execution position $D = D_T - V_{init}(T_T - T_E)$, where $D_T$ and $T_T$ are transmission distance and time respectively for which they are received from the vehicle.

Figure 7:
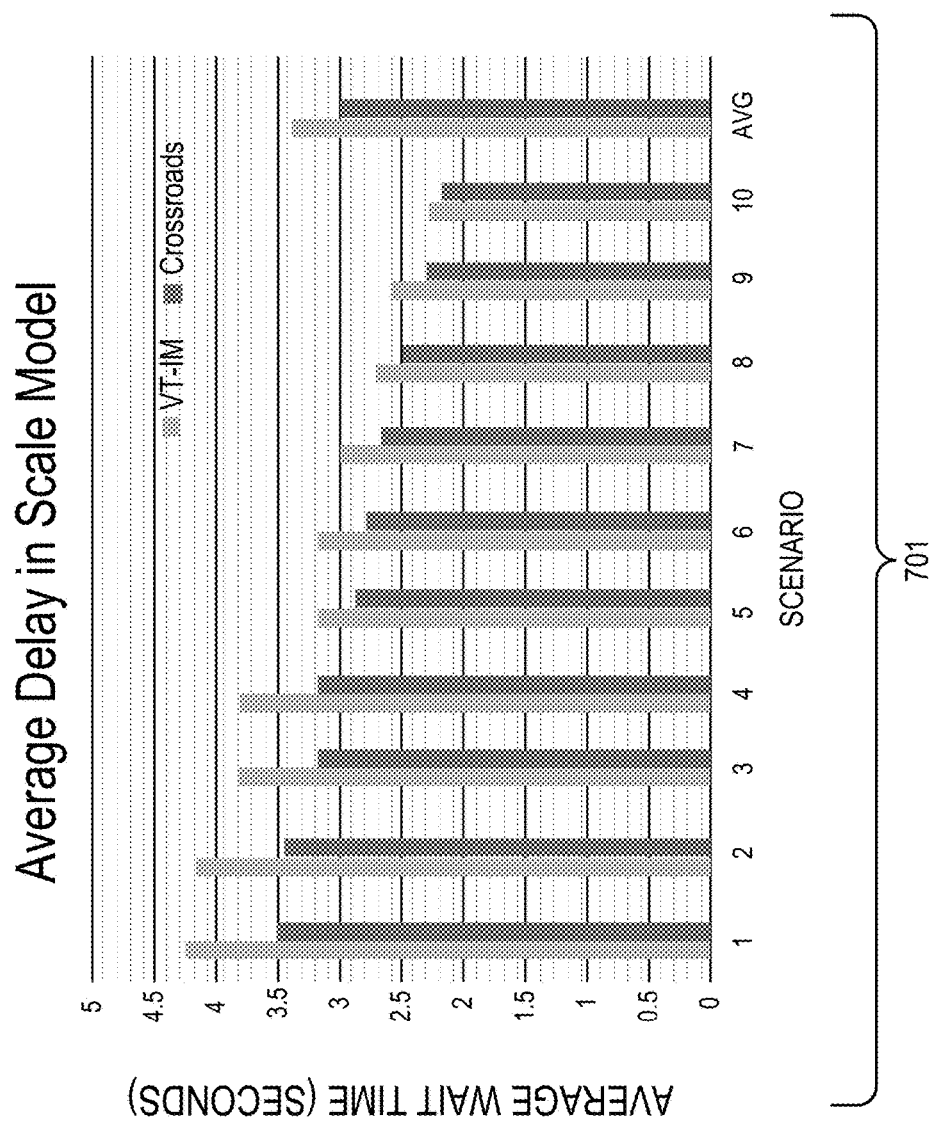
FIG. 7 depicts an average wait time comparison for vehicles in four different scenarios utilizing the time-sensitive methodology in accordance with described embodiments.

FIG. 7 depicts an average wait time comparison 701 for the example vehicles used in the scale model of FIG. 1, in ten different scenarios utilizing the time-sensitive approach in accordance with described embodiments, as compared with the same vehicles using the VT-IM approach.

As described above, and as here shown, use of a time sensitive methodology enables efficient intersection management. In order to evaluate the effect of the extra safety buffer, 10 different traffic scenarios were designed and tested utilizing two different IMs. Specifically, a VT-IM intersection manger, which requires the extra safety buffers (based on RTD) for safe operation, and a time sensitive IM approach according to various embodiments herein, which does not require the additional safety buffer. The TS-IM embodiment depicted in FIG. 7 is called by its project name "Crossroads."

Scenarios 1 and 10 were designed as worst-case and best-case scenarios for the VT-IM respectively. In the best case, Scenario 10, traffic was so sparse that the presence or absence of the safety buffer did not matter much, and the delay is only slightly longer for the VT-IM. The vehicles may thus traverse the intersection with little conflict. Conversely, in the worst-case, scenario 1, all of the cars arrived at the intersection at almost the same time, and the presence of extra safety buffers around the cars reduced the rate at which the cars were allowed to cross the intersection.

With the remainder of the scenarios, Scenarios 2-9, vehicle order and distances were randomly selected. All of the example traffic scenarios were executed for each type of IM, namely VT and TS, and the delay was measured for all vehicles. An average delay ("AVG" in FIG. 7) was also computed for all vehicles in all and the experiment was then repeated 10 times, resulting in the average wait time comparison plot shown in FIG. 7.

The results, seen in the plot of FIG. 7, show that for each scenario, the time sensitive approach exhibits a lower average delay, ranging from 1.24× better for the worst-case, scenario 1, to 1.08× better for the best case, scenario 10. The slightly improved performance of Crossroads in Scenario 10 is because even in the case where vehicles are sparsely populated, there nevertheless remains some safety buffer conflicts that cause the VT-IM methodology to be slower.

In order to show how the time sensitive method operates in real-world scale, three simulations were implemented in Matlab for each of the query based approach, the velocity-transaction IM with extra safety buffers approach, and finally the time sensitive approach (as used in accordance with various embodiments hereof). The velocity-transaction and the time sensitive IMs were programmed into the simulator utilizing the identical code from the real-world physical 1/10 scale model implementation. Using the Matlab simulations, the following differential equations were then considered to model motion of the vehicles:

$$\begin{cases} \dot{x} = v\cos(\phi) \\ \dot{y} = v\sin(\phi) \\ \dot{\phi} = \frac{v}{l}\tan(\psi) \end{cases},$$

where x,y represents the longitude and latitude respectively of the vehicle in the Cartesian coordinates, $\phi$ represents heading of the car from the East, v is car velocity, l represents the wheelbase of the vehicle, and $\psi$ represents the steering angle of the vehicle. The example Matlab simulations were run on a PC Intel® Core™ i7-6700 @ 3.4 GHz processor with 16 GB of memory and a 64-bit Windows 10 Enterprise operating system.

For the query based simulator, only sensor error buffer was considered. However, for the velocity transaction simulator both sensor error and worst case round trip delay were considered. For the time time-sensitive approach, only sensor error was considered, as the worst case round trip delay is already accounted for through the TS methodology. The same input traffic flow and sequence of vehicles were utilized for all simulators so as to have a fair comparison.

The same velocity computational method for the VT-IM and the TS-IM simulations were considered, so as to emphasize the effect of a larger buffer. IN the simulation results, although the computation time of VT-IM and TS-IM was approximately the same, the query based methodology exhibited up to a 16× higher computation overhead. However, due to trial error scheme of the query based approach, there was seen a 16× more computational delay than the time sensitive approach, on average. The results of the simulations are presented in FIGS. 8 and 9, next described.

Figure 8:
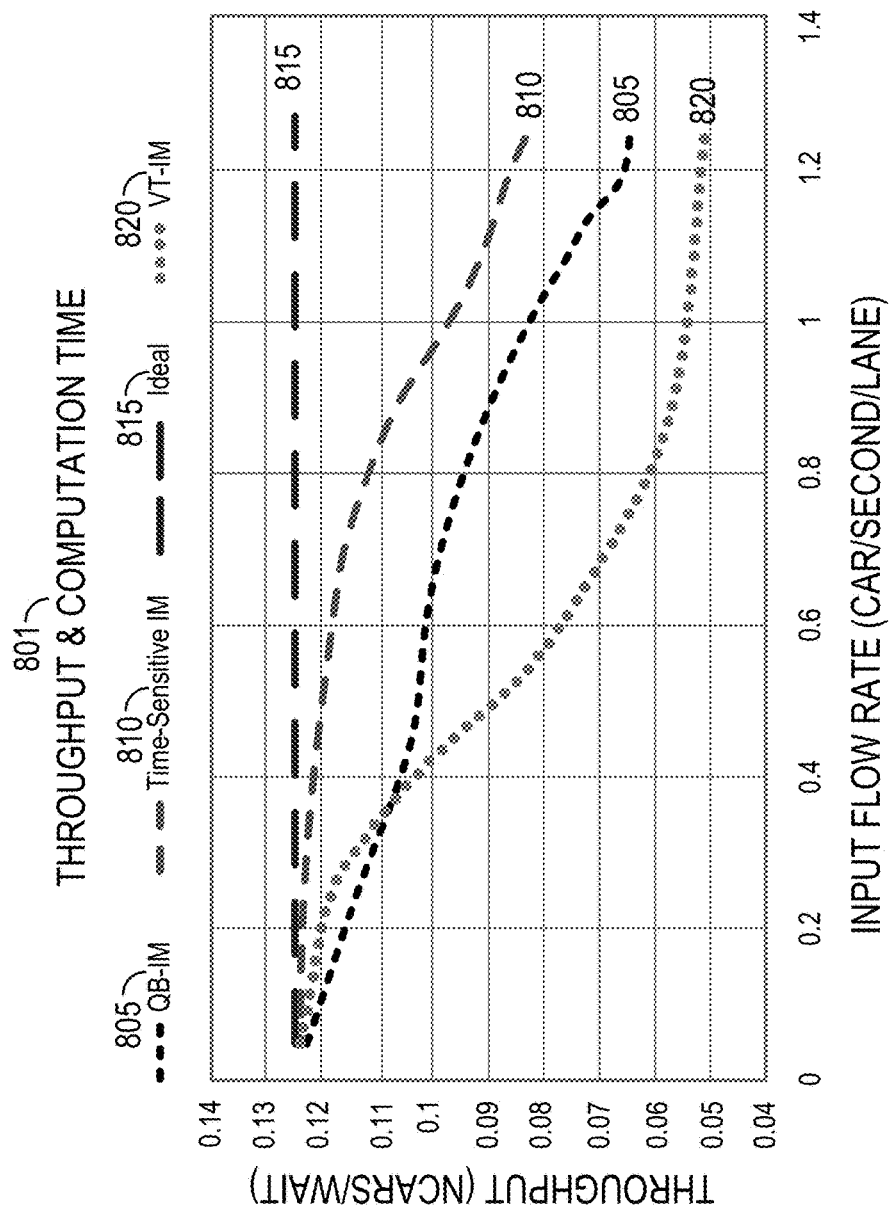
FIG. 8 depicts throughput and computation time for different traffic flow rates for each of three methodologies in accordance with described embodiments.

FIG. 8 depicts throughput and computation time 801 for different flow rates for each of the three intersection management methodology simulations described above. Similarly, FIG. 9 depicts an alternative throughput 902 chart for different flow rates, for a comparison of the VT-IM and TS-IM approaches in a multi-lane simulation.

Specifically depicted in FIG. 8 are throughputs of the intersection for different flow rates routing 160 cars for each of: a query based IM 805, a time sensitive IM 810, and a velocity transaction IM 820, each of which are compared against an ideal baseline 815. For the purposes of FIG. 8, throughput may be defined as a number of managed vehicles ("NCARS") divided by a total wait time ("WAIT"). As can be seen with reference to FIG. 8, throughput for the TS-IM 810 was seen to be 1.28× greater than for the QB-IM 805 in the worst case, and 1.15× on average. Moreover, TS-IM 810 was seen to be 1.62× better than VT-IM 820 in the worst case, and 1.36× on average. These results show that while all three methods have the same throughput, QB-IM 805 and VT-IM 820 become saturated with increasing input flow rate.

However, as shown in the simulation results of FIG. 8, VT-IM 820 exhibits greater efficiency than QB-IM 805 at low input flows (0.05-0.4 Car/Lane/Second). This is understood to be because at low flow rates there are fewer conflicts between arriving vehicles. However, as shown, at higher flow rates (0.45-1.25 Car/Lane/Second), QB-IM 805 can handle the traffic in a more efficient manner than VT-IM 820 as VT-IM 820 uses a larger buffer for each vehicle under its management, as described above, than does QB-IM 805.

Figure 9:
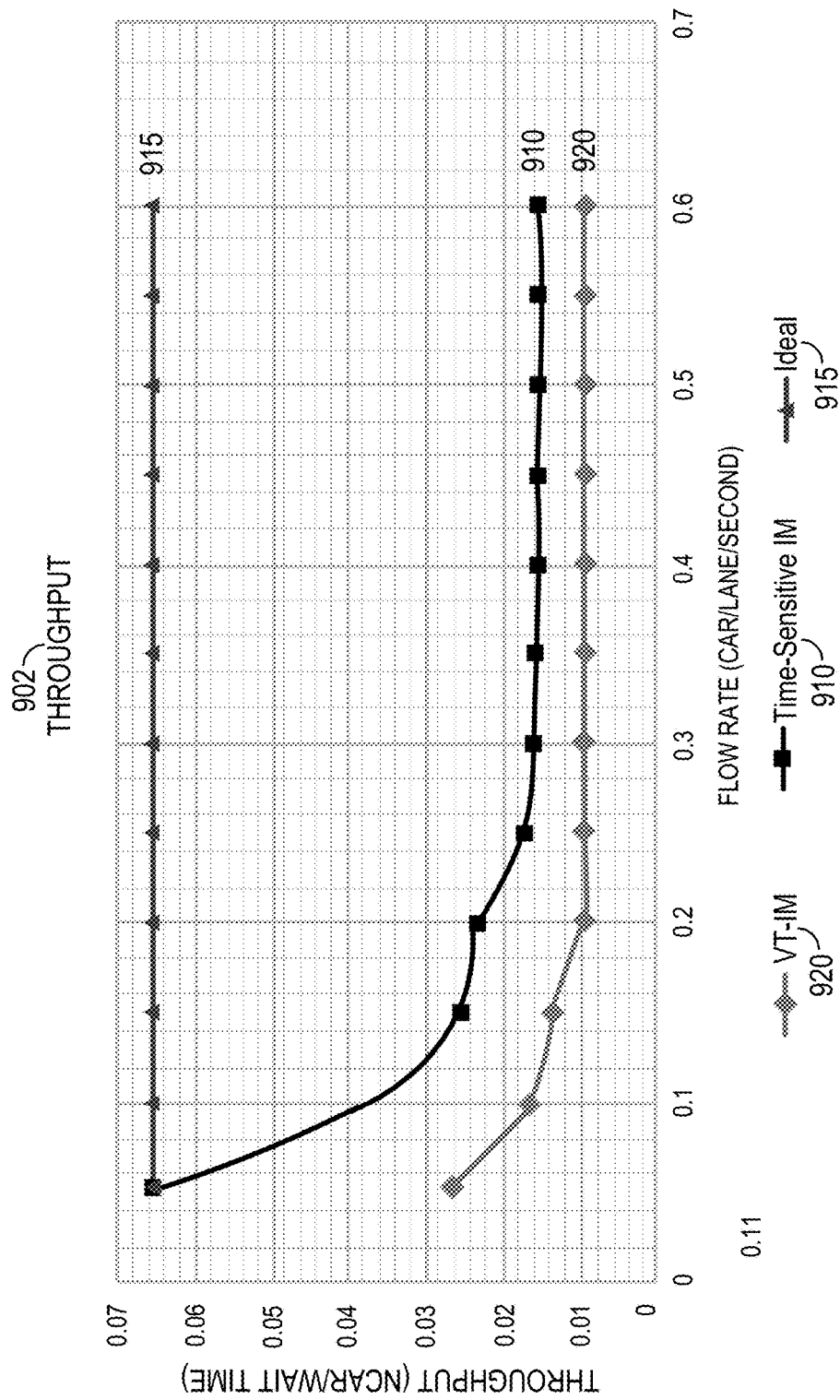
FIG. 9 depicts an alternative throughput chart for different flow rates for the velocity, transaction, and time sensitive intersection management approaches in a multi-lane simulation, in accordance with described embodiments.

As shown in FIG. 9, the results from the multi-lane Matlab simulations show that even when multiple lanes are considered, TS-IM 910 exhibits better throughput in comparison with VT-IM 920. This is because at higher input flow rates, time sensitive IM 910 is not degraded by the effects of the extra buffer required by the VT-IM 920, which thus saturates the intersection earlier.

Figure 10:
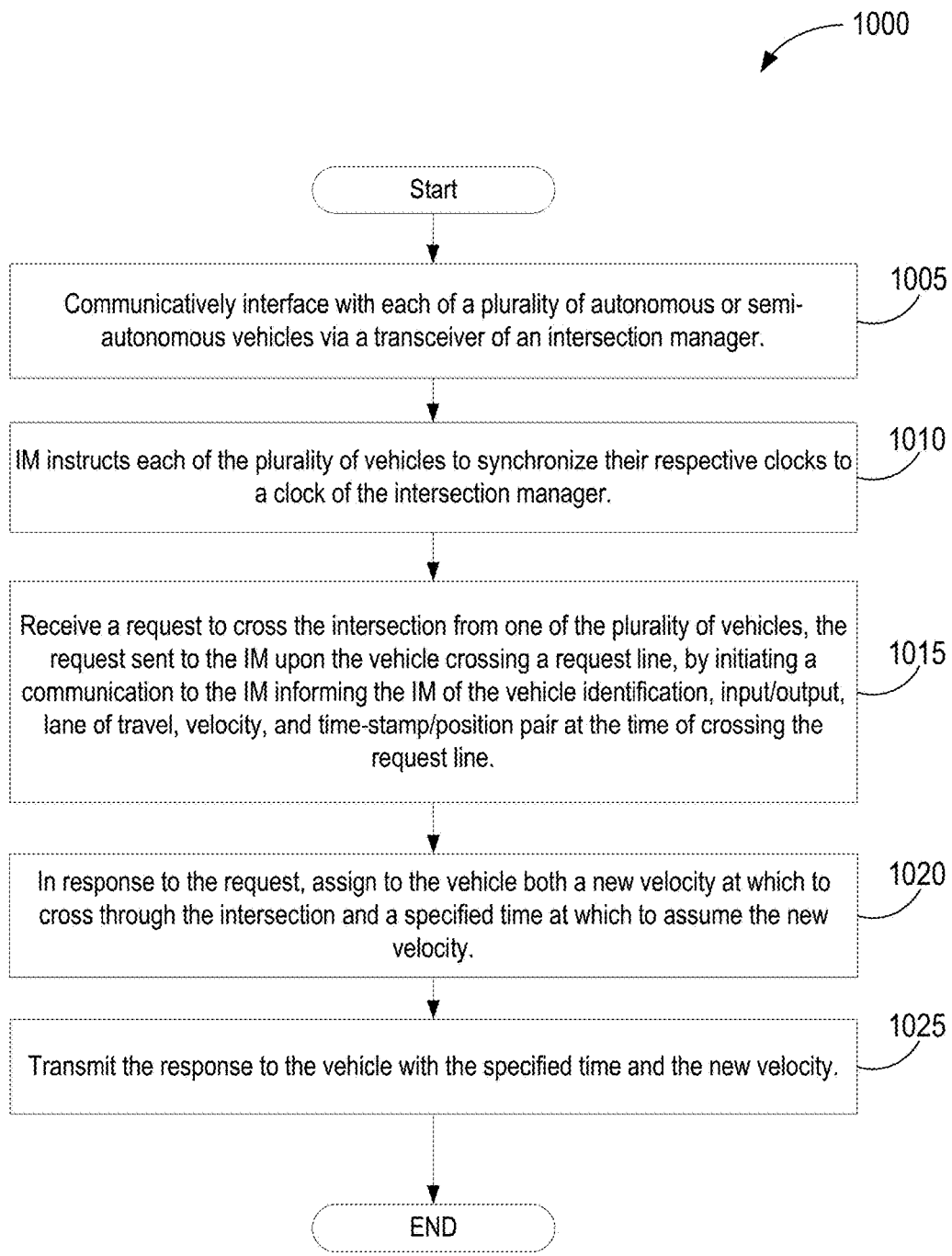
FIG. 10 depicts a process flow diagram illustrating a method for implementing time sensitive autonomous intersection management in accordance with disclosed embodiments.

FIG. 10 depicts a flow diagram illustrating an example method 1000 for implementing time sensitive autonomous intersection management in accordance with various embodiments. Method 1000 may be performed by processing logic that may include hardware (e.g., circuitry, dedicated logic, programmable logic, microcode, etc.), software (e.g., instructions run on a processing device), or any combination of hardware and software, to perform various operations such as communicating, interfacing, instructing, receiving, assigning, transmitting, synchronizing, exposing, loading, executing, operating, generating, storing, maintaining, creating, returning, presenting, processing, providing, determining, triggering, displaying, updating, sending, etc., in pursuance of the systems and methods as described herein. Some of the blocks and/or operations listed below are optional in accordance with certain embodiments. The numbering of the blocks presented is for the sake of clarity and is not intended to prescribe an order of operations in which the various blocks must occur. In alternate embodiments, process 1000 may have more or less operations, and some of the operations may be performed in different order.

With reference to FIG. 10, method 1000 may begin at block 1005, where processing logic, for example, may communicatively interface with each of a plurality of autonomous or semi-autonomous vehicles via a transceiver of an IM. From block 1005 process 1000 may move to block 1010, where the IM may instruct each of the plurality of vehicles to synchronize their respective clocks to a clock of the IM.

From block 1010 process 1000 may move to block 1015, where the IM may receive a request to cross the intersection from one of the plurality of vehicles, the request having sent to the IM upon the vehicle crossing a request line, by initiating a communication to the IM informing the IM of vehicle identification, input/output lane of travel, velocity, and time-stamp/position pair at the time of crossing the request line. It is here noted that timestamp/position pair refers to the measured vehicle position, and the time of that measurement.

From block 1015 process 1000 may move to block 1020, where the IM may assign to the vehicle both a new velocity for the vehicle to traverse through the intersection and a specified time at which to assume the new velocity.

Finally, from block 1020 process 1000 may move to block 1025, where the IM may transmit a response to the vehicle with the new velocity and the time at which to assume it. At block 1025 process 1000 may terminate.

Figure 11:
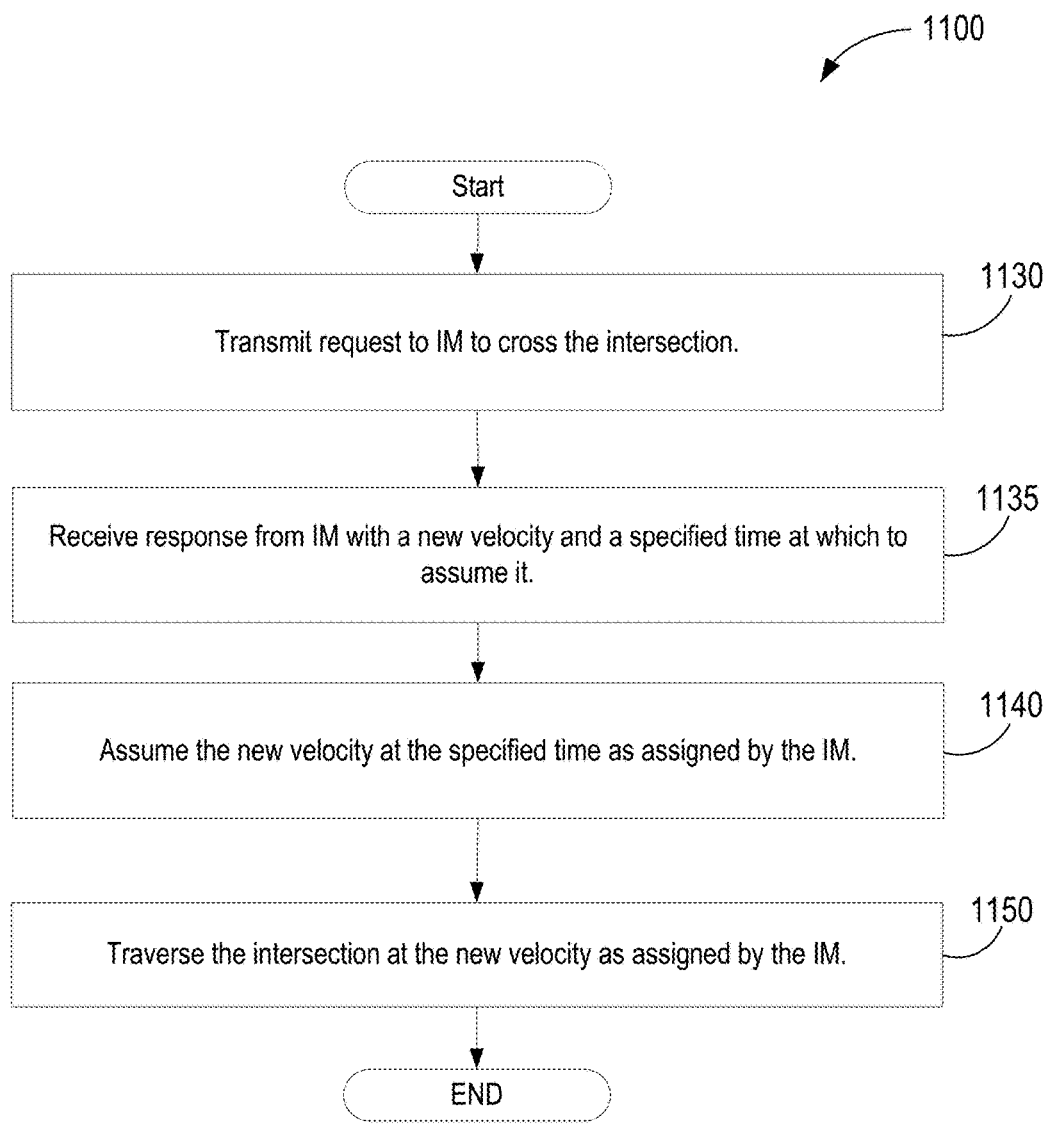
FIG. 11 depicts a process flow diagram illustrating a method for complying with time sensitive autonomous intersection management in accordance with disclosed embodiments.

Similarly, FIG. 11 depicts a flow diagram illustrating a process 1100, related to process 1000 of FIG. 10, for a vehicle interacting with a TS-IM at an intersection managed by the IM, in accordance with various embodiments. Method 1100 may be performed by a vehicle, for example, using processing logic that may include hardware (e.g., circuitry, dedicated logic, programmable logic, microcode, etc.), software (e.g., instructions run on a processing device), or any combination of hardware and software, to perform various operations such as communicating, interfacing, instructing, receiving, assigning, transmitting, synchronizing, exposing, loading, executing, operating, generating, storing, maintaining, creating, returning, presenting, processing, providing, determining, triggering, displaying, updating, sending, etc., in pursuance of the systems and methods as described herein. Some of the blocks and/or operations listed below are optional in accordance with certain embodiments. The numbering of the blocks presented is for the sake of clarity and is not intended to prescribe an order of operations in which the various blocks must occur. In alternate embodiments, process 1100 may have more or less operations, and some of the operations may be performed in different order.

With reference to FIG. 11, process 1100 may begin at block 1130, where the vehicle may transmit a request to a TS-IM to cross through an intersection managed by the IM. From block 1130 process 1100 may move to block 1135, where the vehicle may receive a response from the IM with a new velocity to assume, and a specified time at which to assume it. From block 1135 process 1100 may move to block 1140, where the vehicle may comply with the IM's instruction and assume the new velocity at the specified time assigned by the IM. Finally, from block 1140 process 1100 may move to block 1150, where the vehicle may traverse the intersection at the new velocity assigned by the IM. At block 1150 process 1100 may terminate.

Figure 12:
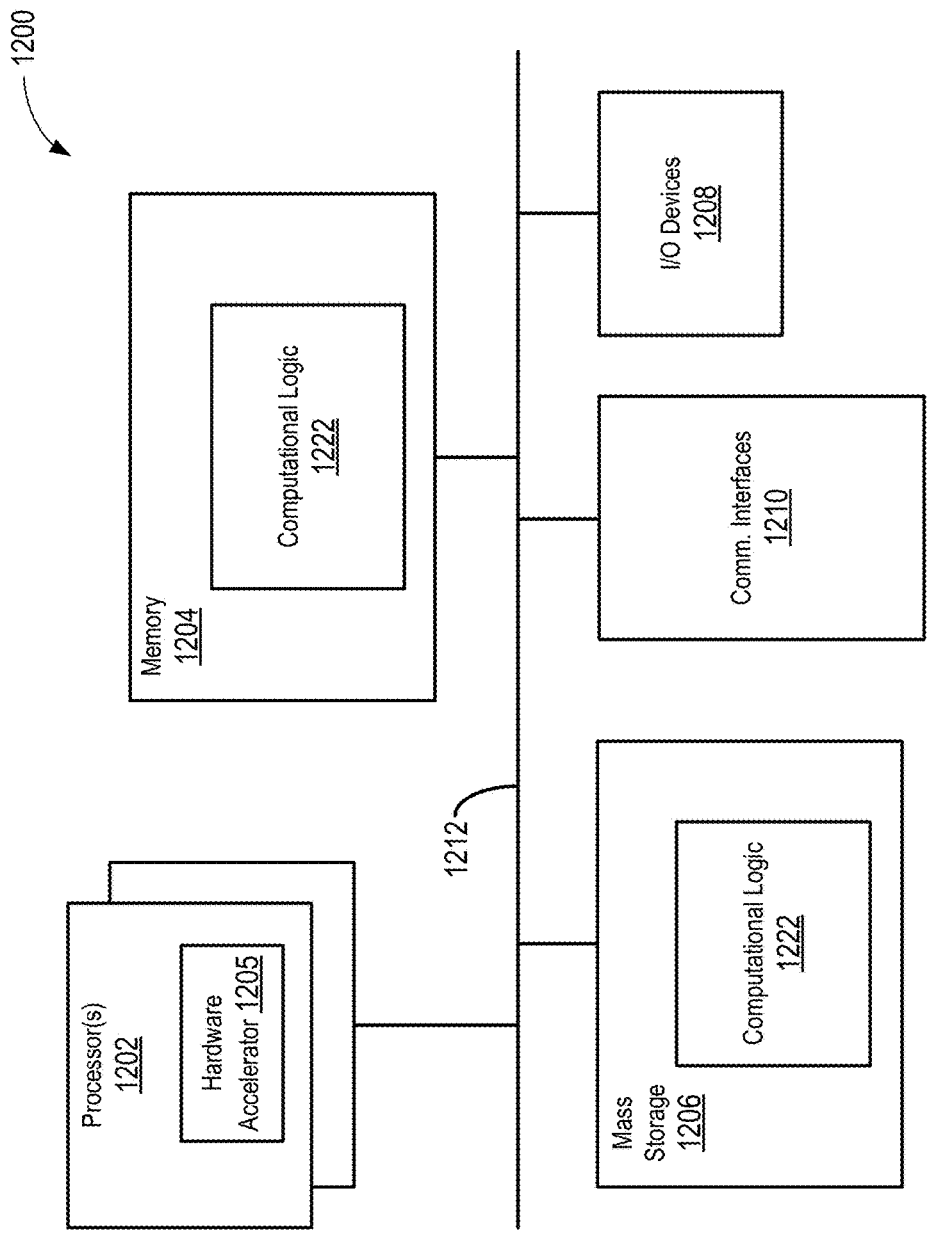
FIG. 12 illustrates a block diagram of a computer device suitable for practicing the present disclosure, in accordance with various embodiments.

Referring now to FIG. 12, a block diagram of a computer device suitable for practicing the present disclosure, in accordance with various embodiments, is illustrated. As shown, computer device 1200 may include one or more processors 1202, memory controller 1203, and system memory 1204. Each processor 1202 may include one or more processor cores, and hardware accelerator 1205. An example of hardware accelerator 1205 may include, but is not limited to, programmed field programmable gate arrays (FPGA). In embodiments, processor 1202 may also include a memory controller (not shown). In embodiments, system memory 1204 may include any known volatile or non-volatile memory.

Additionally, computer device 1200 may include mass storage device(s) 1206 (such as solid state drives), input/output device interface 1208 (to interface with various input/output devices, such as, mouse, cursor control, display device (including touch sensitive screen), and so forth) and communication interfaces 1210 (such as network interface cards, modems and so forth). In embodiments, communication interfaces 1210 may support wired or wireless communication, including near field communication. The elements may be coupled to each other via system bus 1212, which may represent one or more buses. In the case of multiple buses, they may be bridged by one or more bus bridges (not shown).

Each of these elements may perform its conventional functions known in the art. In particular, system memory 1204 and mass storage device(s) 1206 may be employed to store a working copy and a permanent copy of the executable code of the programming instructions of an operating system, one or more applications, and/or various software implemented components of intersection controller 1401, including "input interface 1410", "analyzer 1420" or "output interface 1430", or intersection manager 1450, including "clock 1435" "memory 1427", "intersection controller 1415", or "communication facilities 1425" each described below, collectively referred to as computing logic 1222. In embodiments, the programming instructions implementing computing logic 1222 may comprise assembler instructions supported by processor(s) 1202 or high-level languages, such as, for example, C, that can be compiled into such instructions. In embodiments, some of computing logic may be implemented in hardware accelerator 1205. In embodiments, part of computational logic 1222, e.g., a portion of the computational logic 1222 associated with the runtime environment of the compiler may be implemented in hardware accelerator 1205.

A permanent copy of the executable code of the programming instructions or the bit streams for configuring hardware accelerator 1205 may be placed into permanent mass storage device(s) 1206 and/or hardware accelerator 1205 in the factory, or in the field, through, for example, a distribution medium (not shown), such as a compact disc (CD), or through communication interface 1210 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 1210-1212 may vary, depending on the intended use of example computer device 1200, e.g., whether example computer device 1200 is a smartphone, tablet, ultrabook, a laptop, a server, a set-top box, a game console, a camera, and so forth. The constitutions of these elements 1210-1212 are otherwise known, and accordingly will not be further described.

Figure 13:
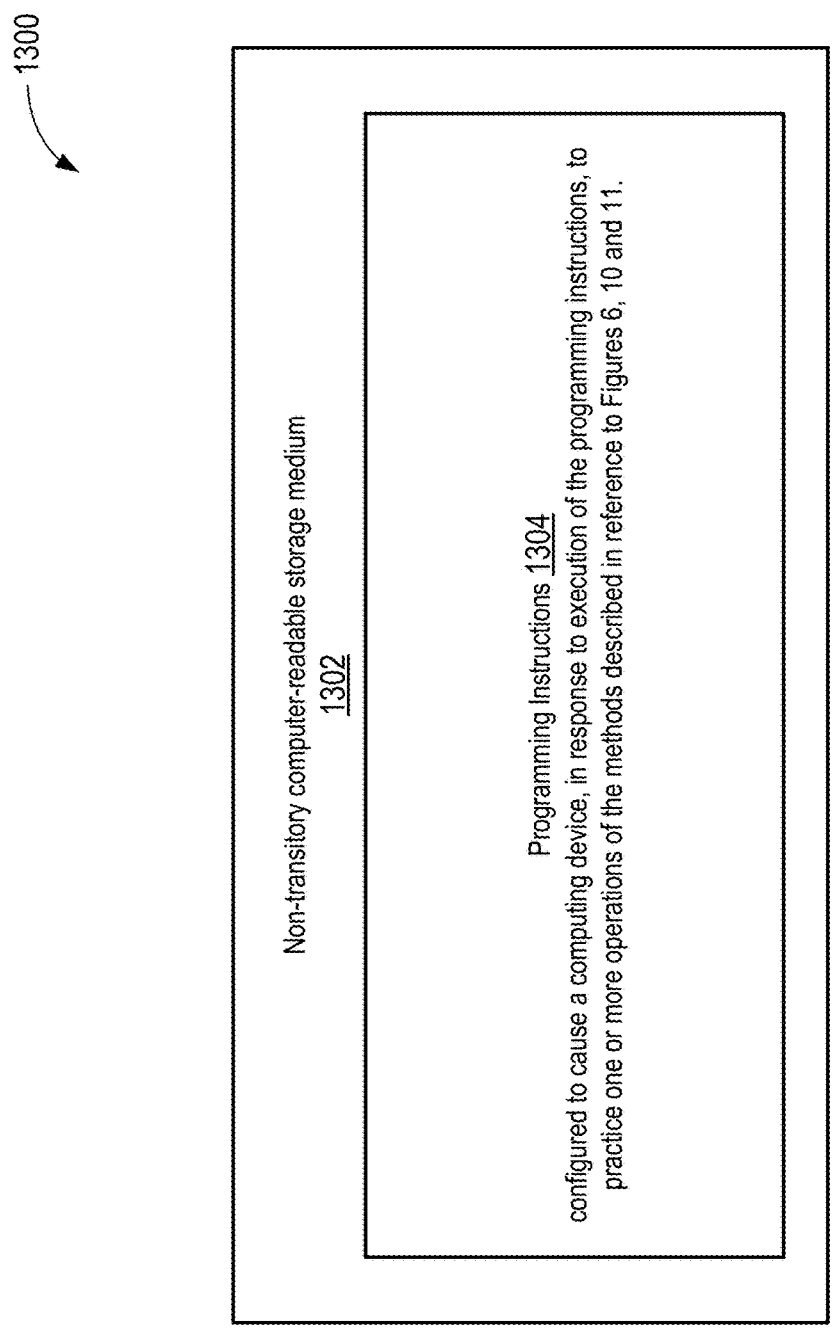
FIG. 13 illustrates an example computer-readable storage medium having instructions configured to practice aspects of the processes of FIGS. 6, 10 and 11 in accordance with various embodiments.

FIG. 13 illustrates an example computer-readable storage medium having instructions configured to implement all (or portion of) software implementations of and/or practice (aspects of) a process as described above in connection with FIG. 6, processes 1000 of FIG. 10, and 1100 of FIG. 11, earlier described, in accordance with various embodiments. As illustrated, computer-readable storage medium 1302 may include the executable code of a number of programming instructions or bit streams 1304. Executable code of programming instructions (or bit streams) 1304 may be configured to enable a device, e.g., computer device 1200, in response to execution of the executable code/programming instructions (or operation of an encoded hardware accelerator 1275), to perform (aspects of) processes described in connection with FIG. 6, process 1000 of FIG. 10, and/or process 1100 of FIG. 11, or processes described in connection with FIG. 14, described below. In alternate embodiments, executable code/programming instructions/bit streams 1304 may be disposed on multiple non-transitory computer-readable storage medium 1302 instead. In embodiments, computer-readable storage medium 1302 may be non-transitory. In still other embodiments, executable code/programming instructions 1304 may be encoded in transitory computer readable medium, such as signals.

Referring back to FIG. 12, for one embodiment, at least one of processors 1202 may be packaged together with a computer-readable storage medium having some or all of computing logic 1222 (in lieu of storing in system memory 1204 and/or mass storage device 1206) configured to practice all or selected ones of the operations earlier described with reference to FIGS. 6, 10 and 11, or as described below with reference to FIG. 14. For one embodiment, at least one of processors 1202 may be packaged together with a computer-readable storage medium having some or all of computing logic 1222 to form a System in Package (SiP). For one embodiment, at least one of processors 1202 may be integrated on the same die with a computer-readable storage medium having some or all of computing logic 1222. For one embodiment, at least one of processors 1202 may be packaged together with a computer-readable storage medium having some or all of computing logic 1222 to form a System on Chip (SoC). For at least one embodiment, the SoC may be utilized in, e.g., but not limited to, a hybrid computing tablet/laptop.

Figure 14:
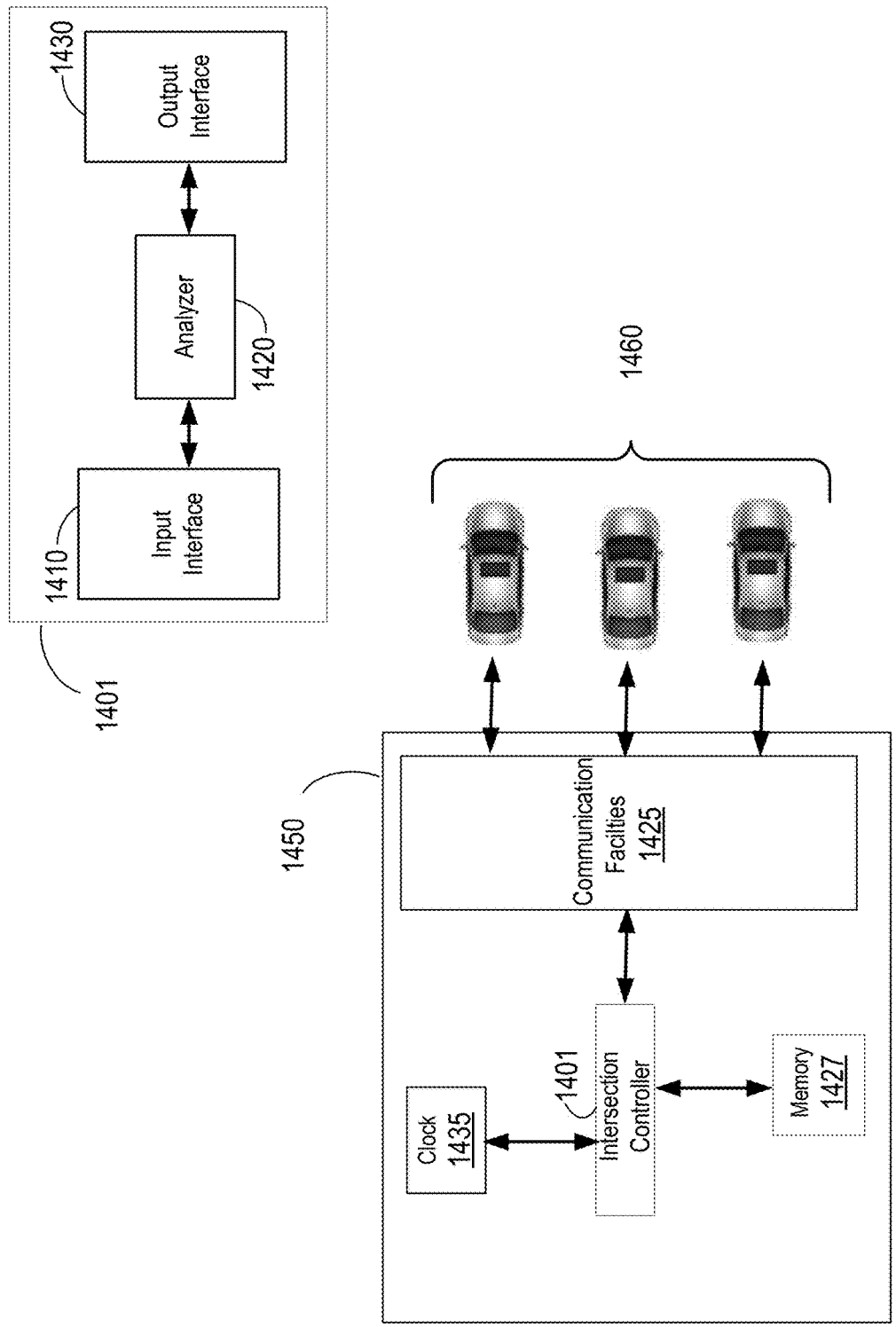
FIG. 14 illustrates an example apparatus according to various embodiments, and an example deployment of the apparatus in an example intersection manager.

FIG. 14 illustrates an example apparatus 1401 according to various embodiments, and an example deployment of the apparatus in an example IM 1450. With reference to apparatus 1401, the apparatus may be sometimes referred to as an "intersection controller." With reference thereto, apparatus 1401 may include an input interface 1410 to receive intersection crossing requests from one or more autonomous or semi-autonomous vehicles, as described above. Input interface 1410 may be communicatively coupled to a receiver, such as, for example, a receiver of an autonomous IM 1450. Apparatus 1401 may further include an output interface 1430, which may, for example, be communicatively connected to a transmitter, such as a transmitter of an example autonomous IM, such as, for example, IM 1450. Finally, intersection controller 1401 may include analyzer 1420, which may, in embodiments, process the intersection crossing requests, as well as the trajectories of various autonomous or semi-autonomous vehicles in and/or approaching an intersection, to generate a command. The command may, for example, include a crossing velocity and a specified time when the requesting vehicle is to assume the crossing velocity. Intersection controller 1401 may cause the coupled transmitter, via output interface 1430, to transmit the command to a requesting vehicle.

FIG. 14 also illustrates an example IM 1450, into which the example intersection controller 1401, may, in embodiments, deployed. Intersection manager 1450 may include communication facilities 1425, which may include a transmitter and a receiver, by means of which requests may be received from vehicles, and commands may be transmitted or sent to the requesting vehicles. Communication facilities 1425 may thus be communicatively coupled to one or more vehicles 1460, as shown.

As further shown, intersection controller 1401, described above, may be provided in IM 1450, as shown, and may be communicatively connected to clock 1435. Clock 1435 may, in embodiments, provide an accurate time signal to intersection controller 1401, which it may use in issuing synchronization commands and/or intersection crossing commands, to requesting vehicles. Finally, IM 1450 may include memory 1427, coupled to intersection controller 1401, which may store one or more algorithms or data that intersection controller 1401 may use when processes received intersection crossing requests to generate a command. In embodiments, the algorithms and data may include the algorithms used to calculate, for example, ToA and $T_E$, as described above, as well as the various algorithms and variables described more fully above, in connection with FIG. 6 and with FIG. 3.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. An apparatus for intersection management of autonomous or semi-autonomous vehicles, comprising:
   an input interface to receive an intersection crossing request from one or more autonomous or semi-autonomous vehicles, the request including vehicle data; an output interface coupled to a transmitter; and
   an analyzer coupled to the input interface and to the output interface to: process the request, based, at least in part, on the vehicle data, to generate a command including a crossing velocity and a time to assume the crossing velocity, and cause the transmitter, via the output interface, to transmit the command to the requesting vehicle
   wherein at least one of:
   the crossing request is sent upon a vehicle passing a request line a distance ahead of the intersection, or
   the vehicle data includes vehicle identification, input/output lane of travel, velocity, and time-stamp/position pair at the time of crossing the request line.

2. The apparatus of claim 1, wherein the crossing request from a vehicle follows a time synchronization message sent by the apparatus, and wherein the analyzer is further to generate the time synchronization message and cause the transmitter to transmit the time synchronization message to the vehicle.

3. The apparatus of claim 2, wherein the vehicle first requests the time synchronization message.

4. The apparatus of claim 1, further comprising a memory coupled to the processor, to store one or more algorithms to be used by the analyzer.

5. The apparatus of claim 1, further comprising the transmitter, and a receiver coupled to the input interface.

6. The apparatus of claim 1, wherein at least one of:
   the apparatus is disposed in an autonomous intersection manager (IM); or the apparatus is integrated with the autonomous IM.

7. The apparatus of claim 6, wherein the intersection manager is provided at an intersection.

8. The apparatus of claim 1, wherein generate a command including a crossing velocity and a specified time further includes check for conflicts between the requesting vehicle's trajectory and the trajectories of other vehicles already past the request line.

9. The apparatus of claim 1, wherein generate a command including a crossing velocity and a specified time further includes to calculate a Time of Arrival (ToA) and an execution time (TE) for the requesting vehicle, and send TOA and TE to the requesting vehicle.

10. The apparatus of claim 1, further comprising a clock, coupled to the analyzer, to provide an accurate time signal to the apparatus, to use in issuing one or more of synchronization commands or intersection crossing commands, to requesting vehicles.

11. A method of crossing through an intersection managed by an autonomous intersection manager (IM) performed by an autonomous or semi-autonomous vehicle, comprising:
receiving an instruction to synchronize a vehicle clock from an intersection manager (IM) of an intersection;
synchronizing the vehicle clock in response to the instruction;
upon traversing a request line ahead of the intersection, sending a request to the IM to cross through the intersection, the request including vehicle data;
receiving a response from the IM, the response including a new velocity and a time at which to assume the new velocity; and
conforming its velocity to the new velocity within the specified time and traversing the intersection at the new velocity;
wherein the vehicle data includes vehicle identification, input/output lane of travel, velocity, and time-stamp/position pair at the time of crossing the request line.

12. The method of claim 11, further comprising requesting the synchronization instruction from the IM.

13. The method of claim 11, wherein the response from the IM includes the vehicle's Time of Arrival (ToA) and an execution time (TE), as calculated by the IM.

14. The method of claim 13, further comprising, tracking the execution time and assuming the new velocity upon reaching the execution time.

15. One or more non-transitory computer-readable storage media comprising a plurality of instructions that in response to being executed cause an intersection controller disposed in an intersection manager (IM), to:
receive an intersection crossing request from one or more autonomous or semi-autonomous vehicles, the request including vehicle data;
process the request, based, at least in part, on the vehicle data, to generate a command including a crossing velocity and a specified time to assume the crossing velocity, and cause the IM to transmit the command to the requesting vehicle;
wherein at least one of:
the intersection crossing request is sent upon a vehicle passing a request line a distance ahead of the intersection, or
the vehicle data includes vehicle identification, input/output lane of travel, velocity, and time-stamp/position pair at the time of crossing the request line.

16. The one or more computer-readable storage media of claim 15, wherein a crossing request from a vehicle follows a time synchronization message, and further comprising code that, when executed, causes the intersection controller to generate the time synchronization message and the IM to transmit it to the vehicle.

17. An intersection management system, comprising: an intersection manager (IM) having:
a memory to store instructions;
a processor to execute the instructions; and a transceiver to send and receive data;
a plurality of autonomous or semi-autonomous vehicles, each communicatively linked with the transceiver of the IM;
wherein each of the plurality of vehicles is to synchronize its clock to a clock of the IM;
wherein each vehicle is to transmit a request to cross the intersection, the request being submitted to the IM upon crossing a request line informing the IM of the vehicle identification, input/output lane of travel, velocity, and time-stamp/position pair at the time of crossing the request line;
wherein the IM is to receive the request to cross the intersection from a vehicle and assign to the vehicle a time to assume a new velocity through the intersection;
wherein the intersection manager is to transmit a response to the vehicle with the specified time and the new velocity;
wherein the vehicle is further to receive the response with the specified time and the new velocity and assume the new velocity at the specified time; and
wherein the vehicle it further to traverses the intersection at the new velocity.

* * * * *